(12) United States Patent
Yamamoto

(10) Patent No.: US 6,773,111 B2
(45) Date of Patent: Aug. 10, 2004

(54) PROJECTION TYPE IMAGE DISPLAY APPARATUS

(75) Inventor: Chikara Yamamoto, Saitama (JP)

(73) Assignee: Fuji Photo Optical Co., Ltd., Saitama (JP)

( * ) Notice: Subject to any disclaimer, the term of this patent is extended or adjusted under 35 U.S.C. 154(b) by 0 days.

(21) Appl. No.: 10/463,395

(22) Filed: Jun. 18, 2003

(65) Prior Publication Data

US 2004/0001186 A1 Jan. 1, 2004

(30) Foreign Application Priority Data

Jun. 20, 2002 (JP) .......................................... 2002-180177
May 29, 2003 (JP) .......................................... 2003-152704

(51) Int. Cl.[7] .............................................. G03B 21/14

(52) U.S. Cl. ............................... 353/20; 353/33; 349/9

(58) Field of Search .......................... 353/20, 31, 33, 353/34, 37, 7, 8, 84; 349/5, 8, 9

(56) References Cited

U.S. PATENT DOCUMENTS

| | | | | |
|---|---|---|---|---|
| 5,374,968 A | * | 12/1994 | Haven et al. .................. | 353/31 |
| 5,420,655 A | * | 5/1995 | Shimizu ....................... | 353/33 |
| 6,247,816 B1 | * | 6/2001 | Cipolla et al. ................ | 353/31 |
| 6,343,864 B1 | * | 2/2002 | Tajiri ............................ | 353/20 |
| 6,419,362 B1 | * | 7/2002 | Ikeda et al. .................... | 353/20 |
| 6,450,645 B1 | * | 9/2002 | Jeon ............................. | 353/20 |
| 6,454,416 B2 | * | 9/2002 | Aoto et al. ..................... | 353/31 |

FOREIGN PATENT DOCUMENTS

JP 2001-154152 6/2001

* cited by examiner

Primary Examiner—William C. Dowling
(74) Attorney, Agent, or Firm—Snider & Associates; Ronald R. Snider

(57) ABSTRACT

A projection type display apparatus decomposes white light emitted from a light source into color light components, combines the color light components after image modulation, and projects a desirable image onto a screen by using a projection lens. A lens element constituting a part of the projection lens is disposed upstream a color light combining device for combining the color light components.

20 Claims, 15 Drawing Sheets

EXAMPLE 1

EXAMPLE 3

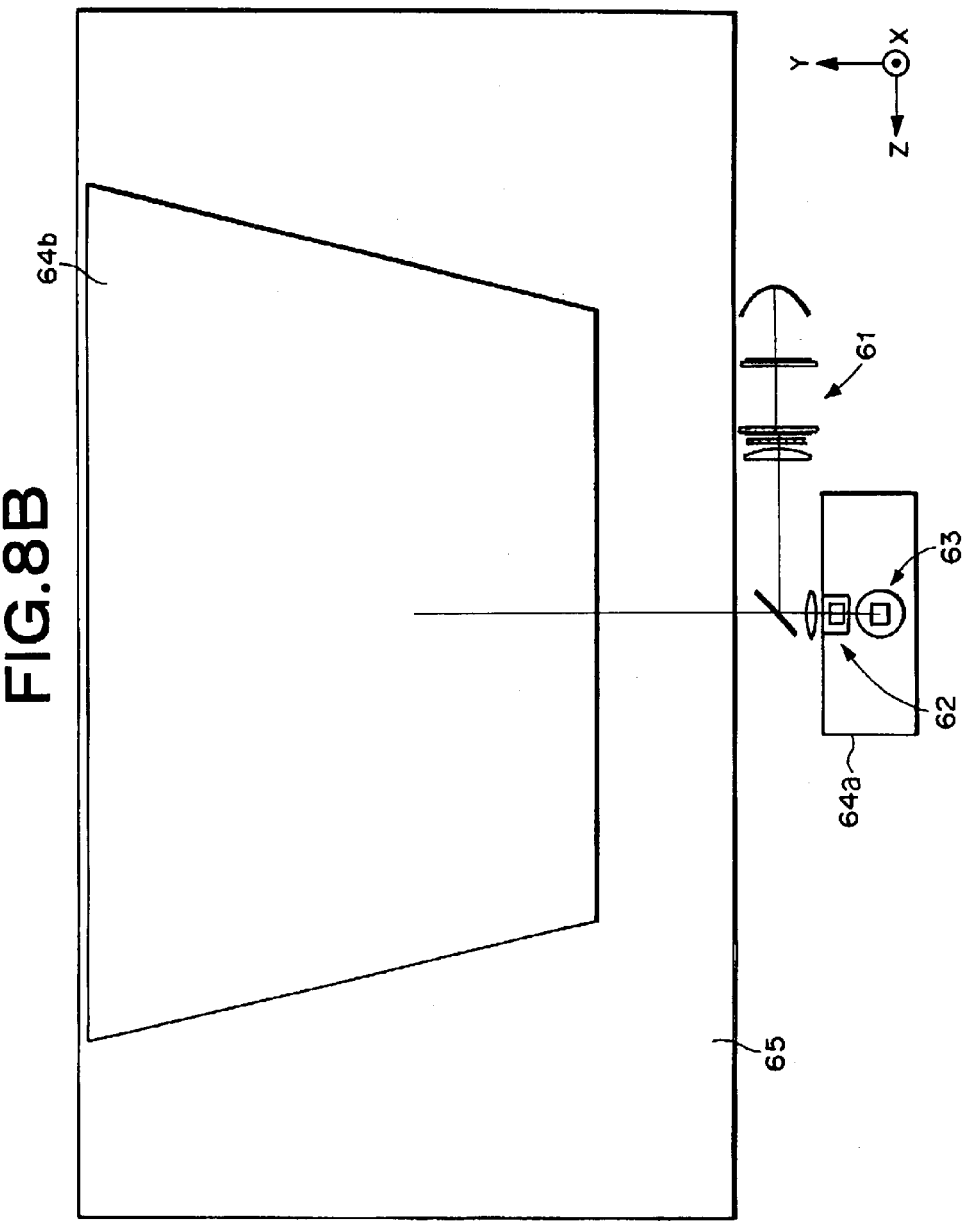

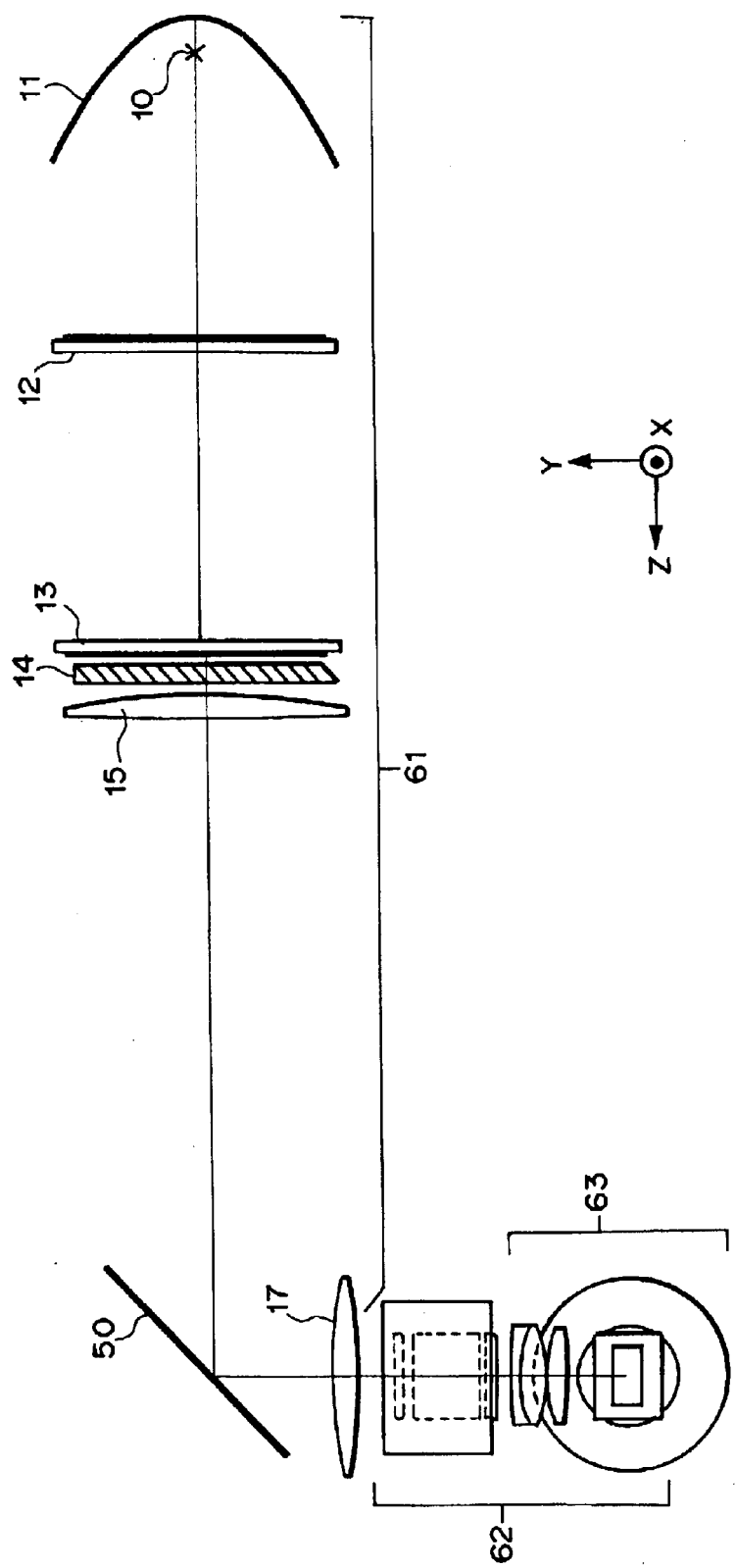

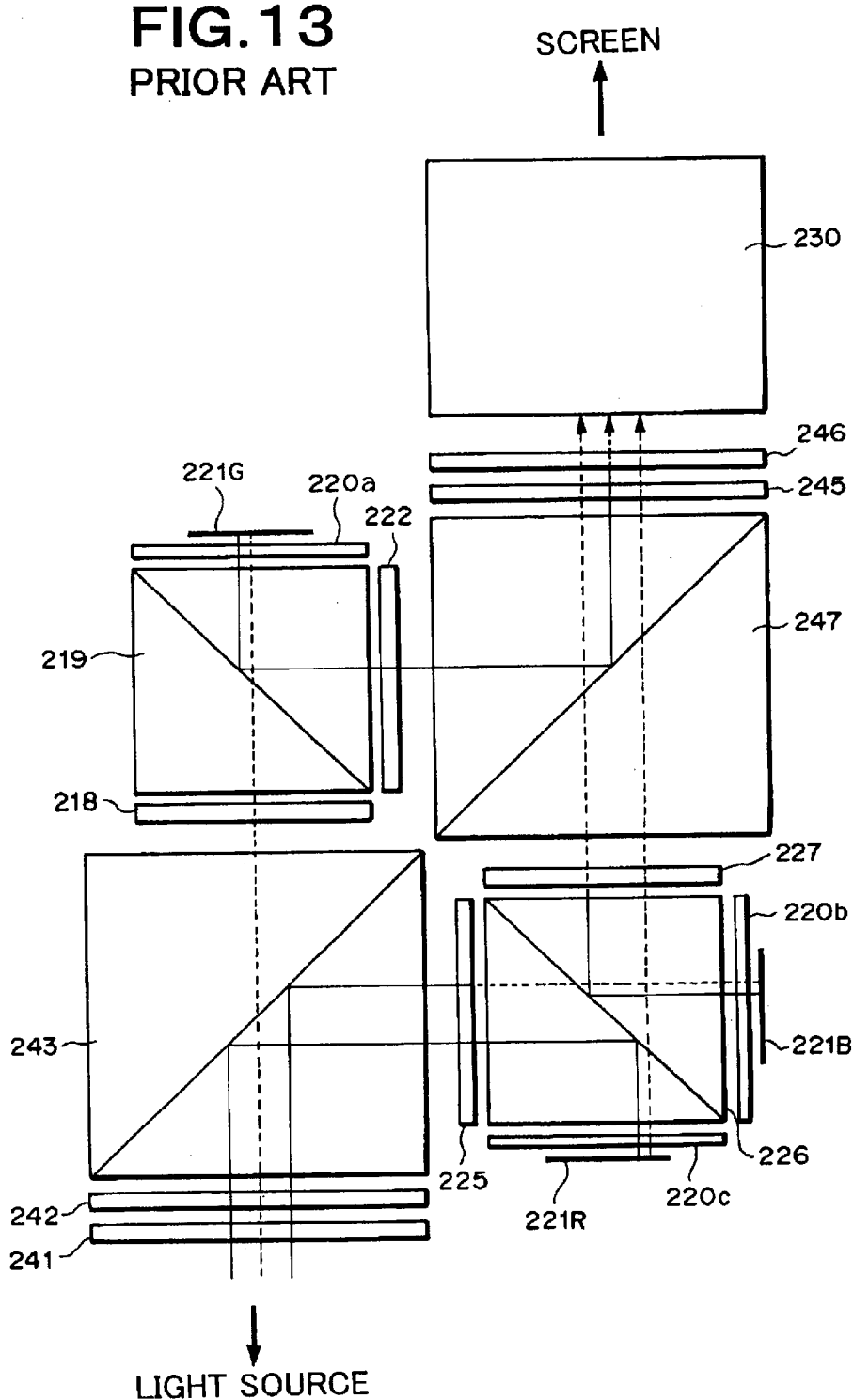

PROJECTION TYPE IMAGE DISPLAY APPARATUS

RELATED APPLICATIONS

This application claims the priorities of Japanese Patent Application No. 2002-180177 filed on Jun. 20, 2002 and Japanese Patent Application No. 2003-152704 filed on May 29, 2003, which are incorporated herein by reference.

BACKGROUND OF THE INVENTION

1. Field of the Invention

The present invention relates to a projection type display apparatus for projecting an image displayed on a reflection type light valve using a liquid crystal or the like onto a screen under magnification; and, more specifically, to a projection type display apparatus having a configuration suitable for widening a projection lens.

2. Description of the Prior Art

Recently, the market for projectors has been greatly expanding as personal computers have come into wider use. Known as a light valve for converting images into signals and carrying out optical modulation are transmission and reflection type liquid crystal display devices and DMD devices in which minute mirrors are regularly arranged. Among them, the reflection type liquid crystal display devices are suitable for making highly efficient, minute pixels, and have become a focus of attention as a light valve providing high-quality images. A characteristic feature of the reflection type liquid crystal display device lies in that they distinguish ON and OFF states of a pixel from each other according to polarization directions by utilizing an optical rotation of the liquid crystal.

Known as an example of a projection type display apparatus using a reflection type liquid crystal light valve is one using four polarization beam splitters. Its schematic configuration will be explained with reference to FIG. 13. This drawing shows a state where, in a projection type display apparatus, white light from a light source is decomposed into three color luminous fluxes of R, G, and B, which are then caused to carry image information items by respective reflection type liquid crystal panels corresponding to the individual color light components, and thereafter combined together, so as to enter a projection lens. The paths of individual color light components are schematically illustrated, whereas solid and dotted lines indicate two kinds of polarization states with polarization directions different from each other. In the following explanation, the solid and dotted lines will refer to S-polarized light and P-polarized light, respectively.

Of the white light emitted from a light source which is not depicted, only S-polarized light is transmitted through a polarizing plate 241, or its polarization direction is adjusted by the polarizing plate 241 after being converted into S-polarized light in an upstream stage which is not depicted. The resulting light component is made incident on a polarizing beam splitter prism (hereinafter referred to as PBS) 243 by way of a specific wavelength polarization converter 242. The specific wavelength polarization converter 242 is a device for converting polarization of light in a specific wavelength band, e.g., converting the polarization of G light into P polarization.

Of the luminous flux incident on the PBS 243, the G light, which is in P polarization, is transmitted through the PBS 243, and further a PBS 219, so as to irradiate a reflection type liquid crystal panel (hereinafter referred to as LCD) 221 G for G light. On the other hand, B light and R light, which are in S polarization, are reflected within the PBS 243, so as to be made incident on a PBS 226. A specific wavelength polarization converter 225 is disposed upstream the PBS 226, so as to convert the polarization of B light into P polarization, for example. As a consequence, the B light is transmitted through the PBS 226, so as to irradiate an LCD 221 B for B light, whereas the R light is reflected by the PBS 226, so as to irradiate an LCD 221 R for R light.

The luminous fluxes carrying respective image information items corresponding to the individual color light components are turned into polarized light components different from those emitted from the PBS 219, 226. Therefore, the G light is reflected within the PBS 219, the B light is reflected within the PBS 226, and the R light is transmitted through the PBS 226, so as to be made incident on a PBS 247.

For improving the contrast of projected images, quarter wave plates 220a, 220b, 220c are disposed upstream the LCDs 221G, 221B, 221R. Polarizing plates 218, 222 are disposed on the light entrance side (PBS 243 side) and light exit side (PBS 247 side) of the PBS 219, so as to adjust deviations in polarization directions. A specific wavelength polarization converter 227 is disposed between the PBSs 226 and 247, so as to convert the polarization of B light into P polarization.

The G light, which is in S polarization, is reflected within the PBS 247, whereas the B light and R light, which are in P polarization, are transmitted therethrough, whereby three color light components are emitted as a composite luminous flux. This luminous flux is transmitted through a specific wavelength polarization converter 245, where the polarization of G light is converted into P polarization, and then a polarizing plate 246, where deviations in polarization directions caused by the PBSs are adjusted, so as to be projected by a projection lens 230.

In such a configuration, four PBSs are employed so as to utilize differences in polarization directions of individual color light components in decomposing and combining colors. Therefore, as compared with the case using dichroic devices, polarization characteristics can be maintained more favorably, and the light utilization efficiency can theoretically be made higher. In practice, however, polarization characteristics are hard to maintain when light is transmitted through large polarizing beam splitters, so that the polarization characteristics are likely to be disturbed, whereby the light utilization efficiency cannot always be made higher. Also, the projection type display apparatus may lower its contrast because of disorders in polarization characteristics.

For eliminating such disorders in polarization characteristics, it has been proposed to use a PBS made of a material having a smaller photoelastic constant. However, materials having a very small photoelastic constant may be not only heavy and expensive, but also environmentally problematic since they contain a large amount of lead and the like. Japanese Unexamined Patent Publication No. 2001-154152 discloses a configuration in which the number of PBSs for use is reduced to 2 or 3, in order to overcome these problems.

Meanwhile, projection lenses for recent projection type display apparatus have been prone to widen lenses by shortening their focal length, so that a large image can be constructed even when the distance from the projection lenses to a screen is short. In particular, the demand for widening is strong in projection lenses employed in front type projectors for use in limited spaces such as those for home use, and rear projection TVs which are required to be made smaller and thinner.

However, it is quite difficult to design wide lenses in projection type display apparatus having the above-mentioned configuration. These apparatus are configured so as to dispose at least a PBS on the LCD side and a PBS, a dichroic mirror, or the like on the projection lens side between the LCD and the lens located closest to the light source in the projection lens. When widening the projection lens while maintaining an absolute distance from such a liquid crystal panel to the projection lens, not only the projection lens but also the whole apparatus is likely to become large. This may not be overcome by the lens design alone under circumstances where the whole apparatus is required to be made smaller.

The technique disclosed in the above-mentioned publication disposes a field lens in the vicinity of a light valve, and describes operations and effects obtained when the field lens is considered to be integrated with the projection lens. Though this technique is effective in reducing the size of PBS or dichroic prism, its operations are obtained by breaking a telecentric luminous flux state, whereby it is not always advantageous when illuminance and chromaticity distributions in images are taken into consideration. It is desirable for luminous fluxes to be in a telecentric state when transmitted through a PBS. If a field lens is disposed near a light valve as such, polarization characteristics may be disturbed when light is transmitted through the field lens, which is unfavorable in terms of light utilization efficiency and contrast.

SUMMARY OF THE INVENTION

In view of such circumstances, it is an object of the present invention to provide a projection type display apparatus which can enhance light utilization efficiency and contrast while facilitating the widening of a projection lens in conformity to recent technical trends.

The present invention provides a projection type display apparatus chromatically decomposing white light emitted from a light source into color light components, chromatically combining the color light components after image modulation, and projecting a desirable image onto a screen by using a projection lens; the apparatus comprising:

color light decomposing means for decomposing the white light into a first color light component in three color light components and the remaining second and third color light components, and emitting thus obtained color light components into respective directions different from each other;

a first optical device for guiding the first color light component emitted from the color light decomposing means to a first reflection type light valve for optically modulating the first color light component and emitting the first color light component optically modulated by the first reflection type light valve;

a second optical device consisting of a polarization separating/combining device for separating the second and third color light components emitted from the color light decomposing means into the second and third color light components, guiding these color light components to second and third light valves for optically modulating the respective color light components, combining the second and third color light components optically modulated by the light valves, and emitting thus combined color light components; and color light combining means for combining the first color light component emitted from the first optical device and the second and third color light components emitted from the second optical device;

wherein a first lens comprising at least one lens element is disposed between the first optical device and the color light combining means; and wherein a second lens comprising at least one lens element is disposed between the second optical device and the color light combining means.

The first optical device may comprise polarization separating/combining device.

Preferably, each of the first and second lenses has a positive refracting power as a whole, the first lens and a third lens disposed on the light exit side of the color light combining means constitute the projection lens, and the second and third lenses constitute the projection lens.

Preferably, polarization direction converting means for converting the white light emitted from the light source into linearly polarized light vibrating in one direction is disposed upstream the color light decomposing means.

Preferably, a polarization converter for converting polarization of light in a specific wavelength band into a polarization direction having a predetermined angle is disposed on a side of the second optical device where a luminous flux from the color light decomposing means is incident. More preferably, a polarization converter for converting polarization of light in a specific wavelength band into a polarization direction having a predetermined angle is disposed on each of sides of the second optical device where a luminous flux from the color light decomposing means is incident and where a luminous flux is emitted to the color light combining means.

The color light combining means may be constituted by a dichroic prism.

The color light decomposing means may comprise color separating means for decomposing incident light according to a wavelength band thereof. The color light decomposing means may be constituted by a polarization converter for converting polarization of light in a specific wavelength band into a polarization direction having a predetermined angle, and a polarization separating device for separating incident light according to a polarization direction thereof.

Preferably, a polarizing plate is disposed on the exit side of each of the first and second optical devices for light directed to the color light combining means. Preferably, a polarizing plate is disposed on the entrance side of each of the first and second optical devices for light from the color light decomposing means.

The reflection type light valves may comprise reflection type liquid crystal display devices.

In another aspect, the present invention provides a projection type display apparatus comprising:

three-color light combining means for combining a first color light component of three primary color light components with the remaining second and third color light components, the first and the remaining second and third color light components being incident on the three-color light combining means in two directions different from each other after being optically modulated by respective reflection type light valves corresponding to the three primary color light components;

two-color light combining means for combining the second and third color light components;

a first lens disposed between the three-color light combining means and the reflection type light valve for optically modulating the first color light component, the first lens comprising at least one lens element;

a second lens disposed between the two-color light combining means and the three-color light combining means, the second lens comprising at least one lens element; and a third lens disposed on a light exit side of the three-color light combining means;

the first and third lenses constituting a projection lens;

the second and third lenses constituting a projection lens.

Preferably, this apparatus further comprises color light decomposing/combining means for decomposing white light emitted from a light source into the first color light and the remaining second and third color light components, and emitting thus obtained color light components into two directions different from each other, the color light decomposing/combining means also acting as the three-color light combining means;

the first or second lens being disposed on an optical path of the color light components decomposed and combined by the color light decomposing/combining means.

Preferably, the color light decomposing/combining means comprises a polarization separating/combining device.

Preferably, a polarization converter for converting polarization of light in a specific wavelength band into a polarization direction having a predetermined angle is disposed on a side of the color light decomposing/combining device where a luminous flux from the light source is incident.

The two-color light component combining means may comprise color separating means for decomposing incident light according to a wavelength band thereof.

Preferably, a polarizing plate is disposed on a side of the color light decomposing/combining device where a luminous flux from the light source is incident.

The reflection type light valves may comprise reflection type liquid crystal display devices.

BRIEF DESCRIPTION OF THE DRAWINGS

FIGS. 8A and 8B are overall sectional views of a first rear projection TV in accordance with the present invention;

FIGS. 9A and 9B are partial sectional views of the rear projection TV shown in FIGS. 8A and 8B;

FIG. 13 is a view for explaining the configuration of a conventional projection type display apparatus.

DESCRIPTION OF THE PREFERRED EMBODIMENTS

Figure 1:
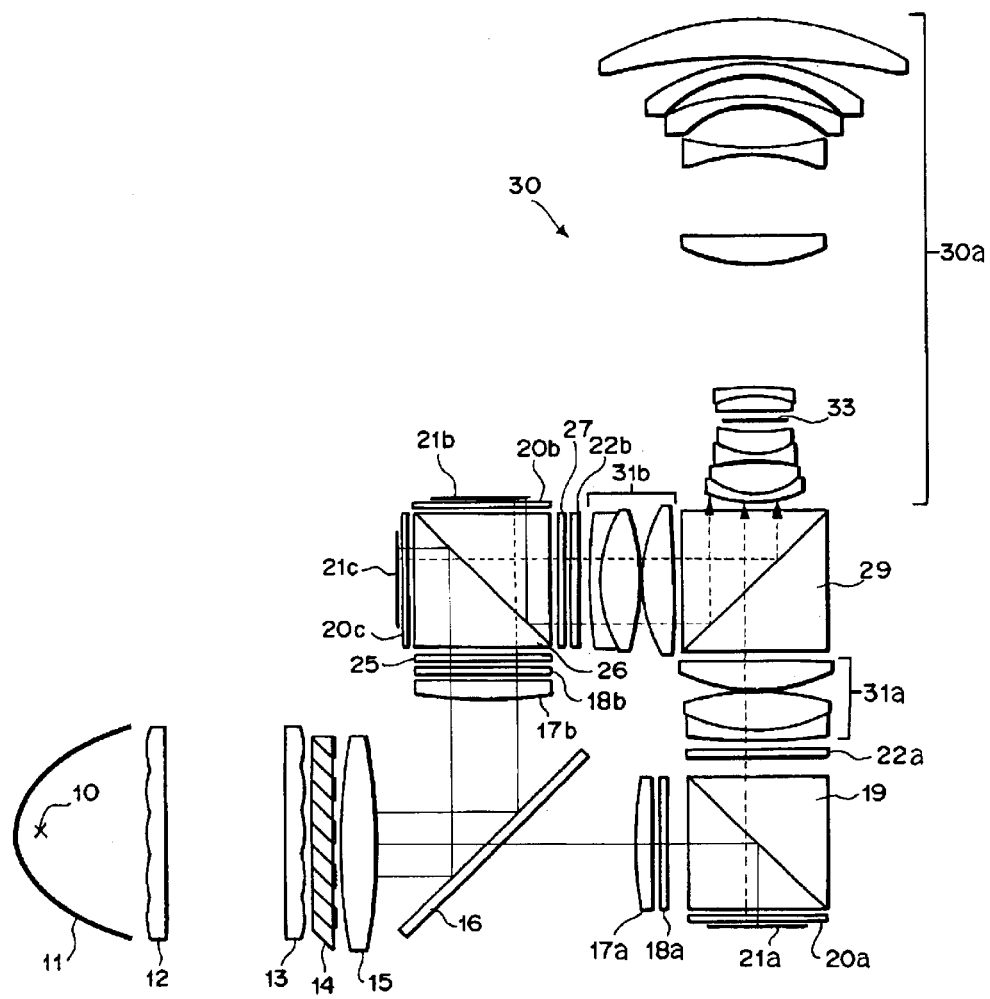
FIG. 1 is a schematic view showing the projection type display apparatus in accordance with Example 1 of the present invention.

In the following, projection type display apparatus in accordance with embodiments of the present invention will be explained with reference to the drawings. FIG. 1 is a view showing the projection type display apparatus in accordance with Example 1 of the present invention which will be explained later. First, with reference to this drawing, the outline of projection type display apparatus common to the embodiments of the present invention will be explained. This projection type display apparatus chromatically decomposes white light emitted from a light source into color light components, chromatically combines the color light components after image modulation, and projects a desirable image onto a screen by using a projection lens.

As a light source section, a light source lamp 10 is disposed at a focal position of a parabolic reflector 11. The light source lamp 10 is a high-luminance white light source such as an ultrahigh-pressure mercury lamp or metal halide lamp. The white light emitted from the light source lamp 10 is unidirectionally reflected by the parabolic reflector 11, so as to become a luminous flux substantially parallel to the optical axis of the parabolic reflector 11, which is then made incident on an integrator optical system.

The integrator optical system is constituted by first and second lens arrays 12, 13, each comprising an array of a plurality of convex lenses arranged like a rectangle on a substrate. The convex lenses of the first lens array 12 oppose their corresponding convex lenses of the second lens array 13, so that the luminous flux of the light source irradiates efficiently and uniformly an effective aperture of a reflection type liquid crystal panel (hereinafter referred to as LCD) which will be explained later. The light incident on the first lens array 12 forms light source images, whose number is the same as that of convex lenses, within a plane perpendicular to the optical axis because of the light-converging action of each convex lens. The second lens array 13 is disposed near these light source images. The light converged by the convex lenses of the second lens array 13 is made incident on a polarization converting optical system 14 adjacent to the second lens array 13.

The polarization converting optical system 14 is an example of polarization direction converting means for converting the white light emitted from the light source lamp 10 into linearly polarized light vibrating in one direction. Separating the luminous flux homogenized by the integrator optical system into P-polarized light and S-polarized light, adjusting them to one of the polarized states, and then outputting the resulting luminous flux as parallel light can improve the light quantity utilization efficiency upon the case simply providing a polarizing plate as polarization direction converting means. Since P polarization is converted into S polarization in the luminous flux emitted from the polarization converting optical system 14, the light source light is guided to the downstream LCD without wasting different kinds of polarization.

While being further converged by condenser lenses 15, 17a, 17b, each composed of at least one lens element, having a positive refracting power, the luminous flux emitted from the polarization converting optical system 14 is decomposed into three color light components, which irradiate their corresponding LCDs 21a, 21b, 21c. The reflected luminous fluxes carrying respective image information items for the individual color light components are combined by a dichroic prism 29 acting as color light combining means, and are projected under magnification onto a screen, which is not depicted, by a projection lens 30 constituted by a lens group 31a and a lens group 30a, or a lens group 31b and the lens group 30a. Thus, the respective images displayed on the LCDs 21a, 21b, 21c are projected as a full-color image onto the screen. In the embodiments of the present invention, as shown in FIG. 1, the lens groups 31a, 31b as a part of the projection lens 30 are disposed upstream the color light combining means (dichroic prism 29 in FIG. 1).

Figure 2:
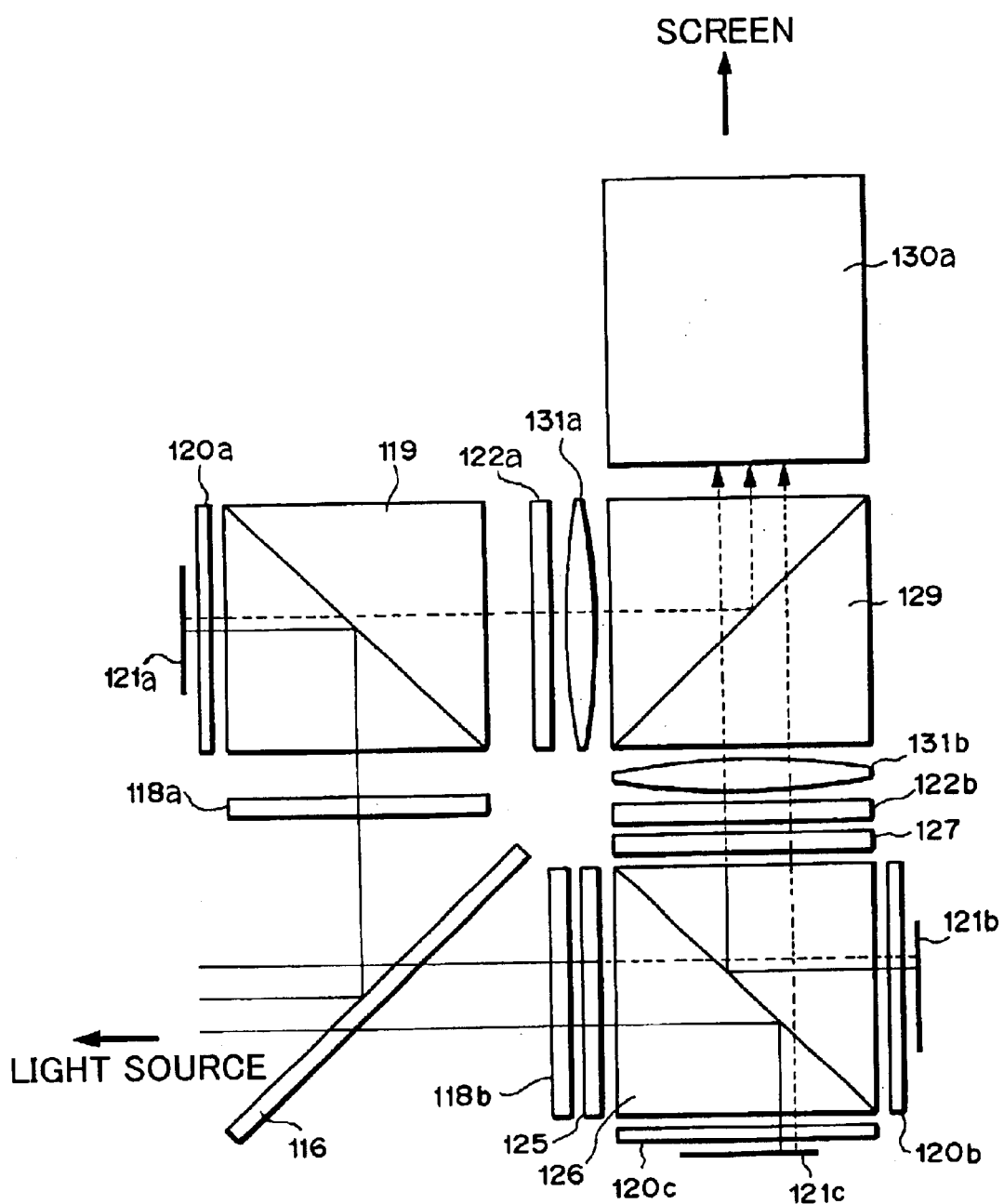
FIG. 2 is a view for explaining a first embodiment of the present invention.

The configuration of the projection type display apparatus in accordance with the first embodiment of the present invention will now be explained with reference to FIG. 2. This embodiment relates to an apparatus comprising a dichroic mirror 116, acting as color light decomposing means, for separating incident light according to its wavelength band. FIG. 2 shows the configuration from the color light decomposing means to color light combining means (which will hereinafter be collectively referred to as a color light decomposing/combining system) in the apparatus. In FIG. 2 and subsequent FIGS. 3 to 12, members operating in substantially the same manner as those of FIG. 1 are referred to with numerals having lower two digits and suffixes identical to those in FIG. 1.

As mentioned above, the luminous flux in S polarization emitted from the polarization converting optical system is decomposed by the dichroic mirror 116 into a first color light component and the remaining second and third color light components in the three color light components according to its wavelength band, so as to be emitted to directions different from each other. Though the first, second, and third color light components will be referred to as G light, B light, and R light for the sake of convenience in the explanation of this embodiment and embodiments which will follow, any color light components can be separated in a given decomposing process as long as LCDs for color light components are disposed at their corresponding positions. The color light paths are shown schematically, whereas solid and dotted lines indicate two kinds of polarization states having polarization directions different from each other, respectively. In the following, for convenience of explanation, the solid and dotted lines refer to S-polarized light and P-polarized light, respectively. The same holds in FIGS. 3 to 12 which will follow.

The dichroic mirror 116 comprises a dichroic film made of a dielectric multilayer film, formed on a glass substrate, having a spectral characteristic as a G light reflecting mirror, while being set such as to yield an incident angle of 45° with the remaining primary color light components, thereby perpendicularly reflecting G light and transmitting B light and R light therethrough. The G light as the first color light component reflected by the dichroic mirror 116 is made incident on a polarizing beam splitter prism (hereinafter referred to as PBS) 119 acting as the first polarization separating/combining device, whereby the G light in S polarization is reflected by the polarization separating film therewithin, so as to be guided to an LCD 121a for optically modulating the G light.

The B light and R light transmitted through the dichroic mirror 116 are made incident on a PBS 126. A specific wavelength polarization converter 125 is disposed upstream the PBS 126, so as to rotate the polarization of one of the color light components, e.g., B light, by a predetermined angle, thereby changing it into P-polarized light. As a consequence, the B light is transmitted through the PBS 126, so as to irradiate an LCD 121b for optically modulating the B light, whereas the R light in S polarization is reflected within the PBS 126, so as to irradiate an LCD 121c for optically modulating the R light.

The luminous fluxes carrying respective image information items for the individual color light components reflected by the LCDs 121a, 121b, 121c are returned to the PBSs 119, 126, while in respective polarization states different from those emitted from the PBSs 119, 126. Therefore, the G light is transmitted through the PBS 119, so as to be made incident on a dichroic prism 129 acting as color light combining means. The B light is reflected within the PBS 126, whereas the R light is transmitted through the PBS 126, whereby the B light and R light are combined together and made incident on the dichroic prism 129.

The dichroic prism 129 is a glass prism within which a dichroic film made of a dielectric multilayer film having a spectral characteristic for reflecting G light is formed. It is set such that the remaining primary light components exhibit an incident angle of 45° with respect to the dichroic film, whereby the G light is perpendicularly reflected whereas the B light and R light are transmitted therethrough. Thus, the three color light components are combined by the dichroic prism 129, so as to be emitted from the color light decomposing/combining system and made incident on a lens group 130a.

For improving the contrast of projected images, quarter wave plates 120a, 120b, 120c are disposed upstream the LCDs 121a, 121b, 121c, respectively. Polarizing plates 118a, 122a are disposed on the light entrance side (light source side) and light exit side (projection lens side) of the PBS 119, respectively, so as to adjust deviations in polarization directions. Specific wavelength polarization converters 125, 127 are disposed on the light entrance side (light source side) and light exit side (projection lens side) of the PBS 126, respectively, so as to convert the polarization of the B light into P polarization. Polarizing plates 118b, 122b are disposed so as to hold the converters 125, 127, thereby adjusting deviations in polarization directions. In particular, the polarizing plates 118a, 118b adjust the deviations in polarization directions caused when luminous fluxes travel by way of the dichroic mirror 116, thereby preventing the light utilization efficiency and the contrast of projected images from decreasing.

Thus, in this embodiment, the number of PBSs is 2, so as to lower the cost and weight, thereby minimizing the amount of substances detrimental to environments such as lead for environmental concerns. Also, while using dichroic mirrors and dichroic prisms, the decrease in light utilization efficiency and the decrease in the contrast of projected images can be suppressed to an unproblematic level.

In this embodiment, as shown in FIG. 2, lens groups 131a, 131b having a positive refracting power are disposed upstream the dichroic prism acting as color light combining means, whereas the lens groups 131a and 130a constitute a projection lens, and the lens groups 131b and 130a constitute a projection lens.

When the lens groups 131a, 131b to become a part of projection lens are thus disposed upstream respective positions where luminous fluxes carrying image information are incident on the color light combining means, it becomes easier to design a wide lens which has recently been demanded as a projection lens. In a conventional apparatus in which the whole projection lens is disposed downstream the color light combining means, a longer distance is necessary between an LCD and the lens closest to the light source in order to arrange members such as color light combining means and analyzers. This makes it difficult to widen the lens. By contrast, the embodiment reduces the number of members to be disposed between the LCD and the lens closest to the light source in the projection lens, thus being able to shorten the focal length of the projection lens. Therefore, without increasing sizes of the projection lens and the whole apparatus, lenses can easily be widened with a lens size on a par with the conventional one. Hence, a wide lens having favorable optical performances can be designed.

In this embodiment, the lens groups 131a, 131b to become a part of projection lens are located downstream respective positions where luminous fluxes carrying image information are emitted from the PBSs 119, 126. Therefore, the luminous flux is in a telecentric state within each PBS, which is suitable for securing uniformity in illuminance and chromaticity distributions in images. Though the telecentric luminous flux state is broken within the dichroic prism 129, characteristics of dichroic coatings can be adjusted and can be corrected to some extent, whereby this embodiment is less problematic than the case where the luminous flux becomes nontelecentric within a PBS.

Though the lens groups 131a, 131b to become a part of projection lens may disturb polarization characteristics if located near light valves, which is unfavorable in terms of light utilization efficiency and contrast, such a problem does not occur in this embodiment.

Figure 3:
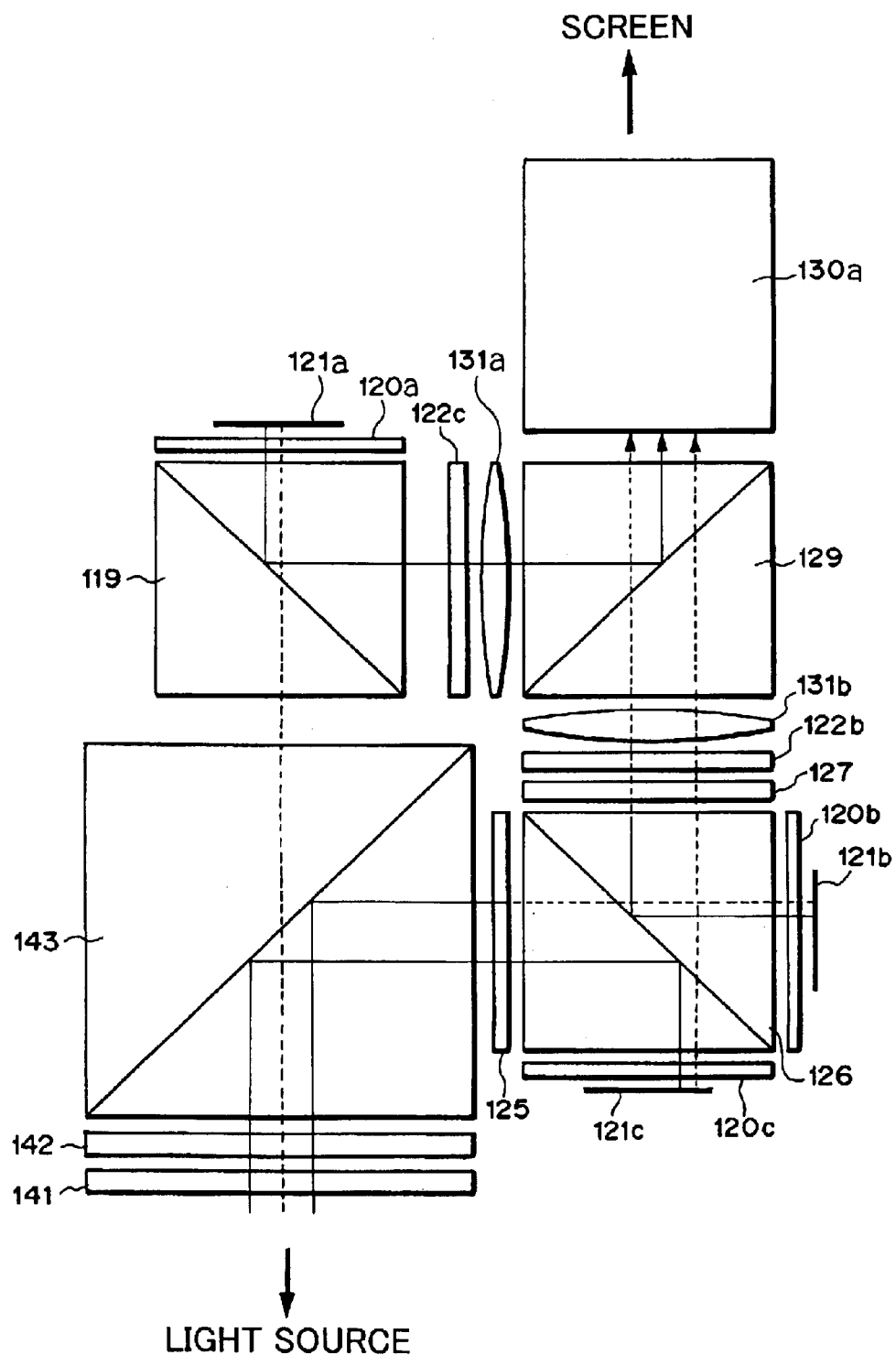
FIG. 3 is a view for explaining a second embodiment of the present invention.

The projection type display apparatus in accordance with the second embodiment of the present invention will now be explained with reference to FIG. 3. This embodiment relates to an apparatus comprising, as color light decomposing means, a specific wavelength polarization converter 142 for converting polarization of light in a specific wavelength band into a polarization direction having a predetermined angle, and a PBS 143 for separating incident light according to its polarization direction. FIG. 3 shows the configuration of a color light decomposing/combining system in this apparatus. As in the first embodiment, the first, second, and third color light components will be referred to as G light, B light, and R light, respectively, for convenience of explanation.

After deviations in the polarization direction of the luminous flux in S polarization emitted from the polarization converting optical system are adjusted by a polarizing plate 141 as mentioned above, the polarization of G light is converted into P polarization by the specific wavelength polarization converter 142. Thus converted luminous flux is made incident on the PBS 143, by which the G light and the remaining B light and R light are separated from each other according to the polarization direction of incident light, so as to be emitted to respective directions different from each other. The PBS 143 perpendicularly reflects the B light and R light in S polarization and transmits therethrough the G light in P polarization because of an action of a polarization separating film therewithin. The G light as the first color light component transmitted through the PBS 143 is made incident on a PBS 119, whereby the G light in P polarization is transmitted through the polarization separating film therewithin, so as to be guided to an LCD 121a for optically modulating the G light.

The B light and R light reflected by the PBS 143 are made incident on a PBS 126. A specific wavelength polarization converter 125 is disposed upstream the PBS 126, so as to rotate the polarization of one of the color light components, e.g., B light, thereby converting it into P polarization. As a consequence, the B light is transmitted through the PBS 126, so as to irradiate an LCD 121b for optically modulating the B light, whereas the R light in S polarization is reflected within the PBS 126, so as to irradiate an LCD 121c for optically modulating the R light.

The luminous fluxes carrying respective image information items for the individual color light components reflected by the LCDs 121a, 121b, 121c are returned to the PBSs 119, 126, while in respective polarization states different from those emitted from the PBSs 119, 126. Therefore, the G light is transmitted through the PBS 119, so as to be made incident on a dichroic prism 129 acting as color light combining means. The B light is reflected within the PBS 126, whereas the R light is transmitted through the PBS 126, whereby the B light and R light are combined together and made incident on the dichroic prism 129. The members downstream the dichroic prism 129 are the same as those of the above-mentioned first embodiment.

For improving the contrast of projected images, quarter wave plates 120a, 120b, 120c are disposed upstream the LCDs 121a, 121b, 121c. Specific wavelength polarization converters 125, 127 are disposed on the light entrance side (light source side) and light exit side (projection lens side) of the PBS 126, respectively, so as to convert the polarization of the B light from S polarization to P polarization. Polarizing plates 122c, 122b are disposed between the PBSs 119, 126 and the dichroic prism 129, so as to adjust deviations in polarization directions, thereby preventing the light utilization efficiency and the contrast of projected images from decreasing.

Lens groups 131a, 131b having a positive refracting power are disposed upstream the dichroic prism 129 acting as color light combining means in this embodiment as well, whereas the lens groups 131a and 130a constitute a projection lens, and the lens groups 131b and 130a constitute a projection lens. As a consequence, this embodiment can reduce the number of members to be disposed between the LCD and the lens closest to the light source in the projection lens, thus being able to shorten the focal length of the projection lens as with the first embodiment. Therefore, without increasing sizes of the projection lens and the whole apparatus, lenses can easily be widened with a lens size on a par with the conventional one. Hence, a wide lens having favorable optical performances can be designed.

The lens groups 131a, 131b to become a part of projection lens are located downstream respective positions where luminous fluxes carrying image information are emitted from the PBSs 119, 126 in this embodiment as well. Therefore, the luminous flux has a telecentric state within each PBS, which is suitable for securing uniformity in illuminance and chromaticity distributions in images. No parts of projection lens are disposed near light valves, whereby polarization characteristics will not be disturbed.

In this embodiment, the number of PBSs is 3, whereby the cost and weight are less than those of a conventional case where the number of PBSs is 4, thus being favorable in terms of environmental concerns. Also, while using a dichroic prism as color light combining means in place of a conventional PBS, the decrease in light utilization efficiency and the decrease in the contrast of projected images can be suppressed to an unproblematic level. Since the number of PBSs is 3, it is advantageous in that the light utilization efficiency is higher than that in the first embodiment.

Figure 7:
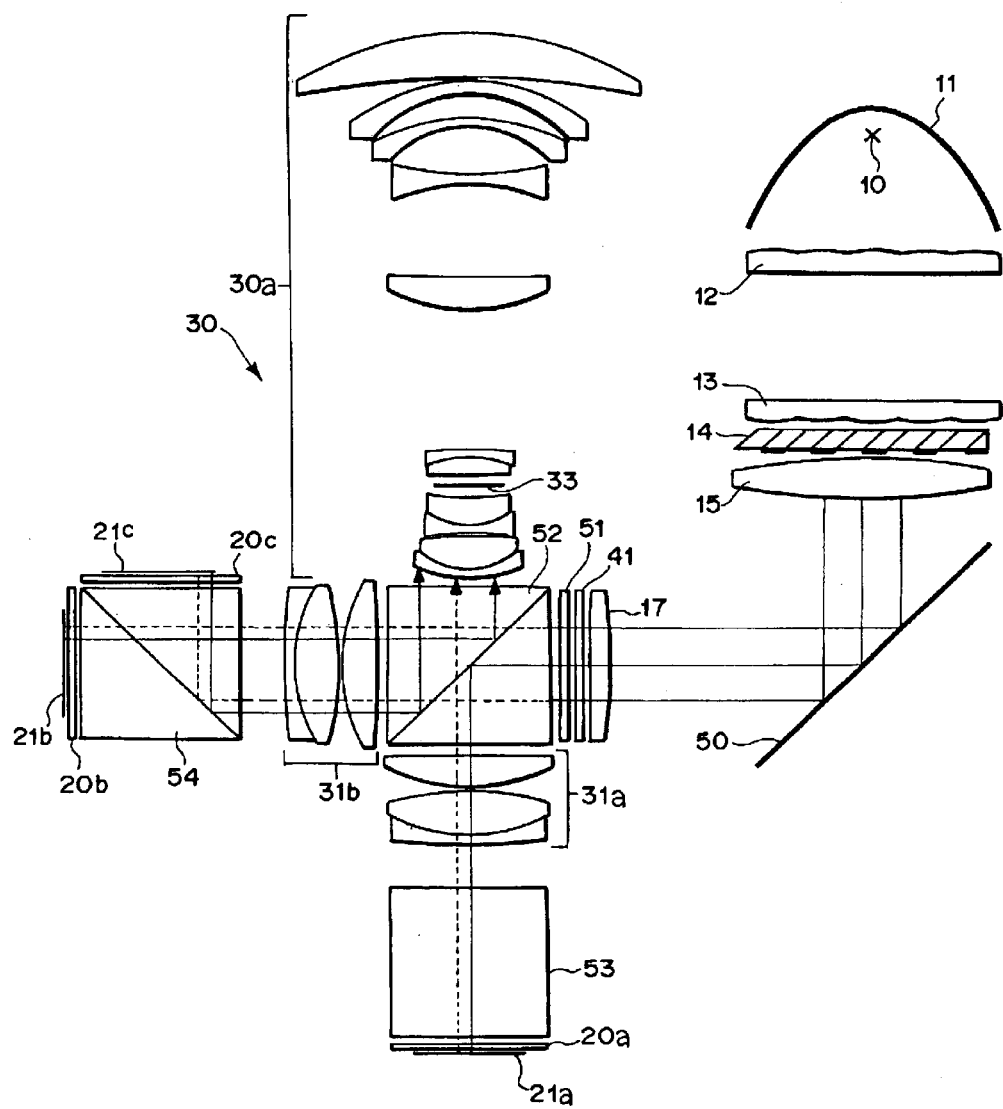
FIG. 7 is a schematic view of the projection type display apparatus in accordance with Example 3.

The configuration of the projection type display apparatus in accordance with a third embodiment of the present invention will now be explained. This embodiment relates to an apparatus having a configuration in which one PBS acts as both color light decomposing means and color light combining means. FIG. 7 is a view showing a schematic configuration of the projection type display apparatus in accordance with Example 3 of the present invention. This embodiment will be explained with reference to FIG. 7. As in the first embodiment, the first, second, and third color light components will be referred to as G light, B light, and R light, respectively, for convenience of explanation.

This embodiment relates to an apparatus comprising, as color light decomposing means, a specific wavelength polarization converter 51 for converting polarization of light in a specific wavelength band into a polarization direction having a predetermined angle, and a PBS 52 for separating incident light according to its polarization direction. A luminous flux turned into S-polarized light by a polarization converting optical system 14 passes through condenser lenses 15, 17. Then, its deviation in polarization direction is adjusted by a polarizing plate 41. Thereafter, with the polarization of B light and R light being converted into P polarization by the specific wavelength polarization converter 51, the luminous flux is made incident on the PBS 52. According to the polarization direction of incident light, the luminous flux is decomposed by the PBS 52 into G light and the remaining B light and R light, which are then emitted in respective directions different from each other. Under the action of the polarization separating film therewithin, the PBS 52 perpendicularly reflects the S-polarized G light and transmits the P-polarized B light and R light therethrough. The G light as the first light component reflected by the PBS 52 is guided by way of a lens group 31a and a glass prism 53 to an LCD 21a for optically modulating the G light.

The B light and R light as the second and third light components transmitted through the PBS 52 are made incident on a dichroic prism 54 by way of a lens group 31b. This dichroic prism 54 is a glass prism within which a dichroic film having a spectral characteristic for reflecting one of color light components, e.g., R light, is provided, and is set such that the remaining primary color light component attains an incident angle of 45° with respect to the dichroic film. Therefore, the B light passes through the dichroic prism 54 and irradiates an LCD 21b for optically modulating the B light, whereas the R light is reflected within the dichroic prism 54, so as to irradiate an LCD 21c for optically modulating the R light.

The luminous fluxes, reflected by the LCDs 21a, 21b, 21c, carrying respective image information items for the individual color light components travel back their paths so as to return to the PBS 52 acting as the color light combining means, while having their respective polarizations different from those emitted from the PBS 52. Therefore, the G light is transmitted through the PBS 52 and combined with the B light and R light reflected by the PBS 52.

For improving the contrast of projected images, quarter wave plates 20a, 20b, 20c are disposed upstream the LCDs 21a, 21a, 21c, respectively. Also, the polarizing plate 41 adjusts the deviation in polarization direction, and prevents the light utilization efficiency from decreasing, and the contrast from lowering in projected images. The glass prism 53 is provided in order to adjust the optical path length of the first color light component to that of the second and third color light components.

In this embodiment, the PBS 52 functions as color light decomposing/combining means for decomposing white light emitted from a light source into a first color light component and the remaining second and third color light components and emitting them in respective directions different from each other, and for combining the optically modulated first color light component and remaining second and third light components made incident thereon in respective directions different from each other and emitting thus combined light.

On optical paths of the color light components decomposed and combined by the PBS 52, lens groups 31a, 31b having a positive refracting power are disposed. The lens groups 30a, 31a form a projection lens, whereas the lens groups 30a, 31b form a projection lens.

Namely, in the projection type display apparatus in accordance with this embodiment, a part (lens group 31a, 31b) of a lens system constituting the projection lens 30 is disposed between each LCD 21a, 21b, 21c and the color light combining means (PBS 52) on the optical path of each color light component combined by the color light combining means (PBS 52). As with the first embodiment, this reduces the number of members disposed between the LCD and the lens closest to the light source in the projection lens, whereby the focal length of the projection lens can be shortened. Therefore, without increasing sizes of the projection lens and the whole apparatus, lenses can easily be widened with a lens size on a par with the conventional one. Hence, a wide lens having favorable optical performances can be designed.

The glass prism 53 or dichroic prism 54 is disposed between each LCD 21a, 21b, 21c and the lens group 31a, 31b in this embodiment as well, whereby no part of the projection lens is disposed near a light valve to disturb polarization characteristics. Also, this embodiment has a simple configuration in which one PBS acts as both color light decomposing means and color light combining means, and only one dichroic prism is disposed in addition, so as to make it possible to decompose and combine three color light components. Since the number of PBS is 1, the cost and weight are less than those of a conventional case where the number of PBSs is 4, thus being favorable in terms of environmental concerns.

In the following, specific examples of the projection type display apparatus in accordance with the present invention will be explained.

EXAMPLES

Example 1

FIG. 1 is a view showing the projection type display apparatus in accordance with Example 1 of the present invention. This example is based on the above-mentioned first embodiment, and relates to an apparatus comprising a dichroic mirror 16, as color light decomposing means, for separating incident light according to its wavelength band. The outline of the whole apparatus is as mentioned above and thus will not be explained. Here, members operating in substantially the same manner as those of the first embodiment are referred to with numerals having lower two digits and suffixes identical thereto.

The configuration of this example differs from that explained in the first embodiment in that a predetermined dichroic film is formed in the dichroic mirror 16, so as to transmit the first color light component therethrough and perpendicularly reflect the second and third color light components. For instance, the first, second, and third color light components are referred to as G light, B light, and R light, respectively, in this example.

The G light transmitted through the dichroic mirror 16 is made incident on a PBS 19 acting as the first polarization separating/combining device, whereby the G light in S polarization is reflected by the polarization separating film therewithin, so as to be guided to an LCD 21a for optically modulating the G light. The B light and R light reflected by the dichroic mirror 16 are made incident on a PBS 26. A specific wavelength polarization converter 25 is disposed upstream the PBS 26, so as to convert the polarization of one of the color light components, e.g., B light, by a predetermined angle, thereby converting it into P polarization. As a consequence, the B light is transmitted through the PBS 26, so as to irradiate an LCD 21b for optically modulating the B light, whereas the R light in S polarization is reflected within the PBS 26, so as to irradiate an LCD 21c for optically modulating the R light.

The luminous fluxes carrying respective image information items for the individual color light components reflected by the LCDs 21a, 21b, 21c are returned to the PBSs 19, 26, while in respective polarization states different from those emitted from the PBSs 19, 26. Therefore, the G light is transmitted through the PBS 19, so as to be made incident on a dichroic prism 29 acting as color light combining means. The B light is reflected within the PBS 26, whereas the R light is transmitted through the PBS 26, whereby the B light and R light are combined together and made incident on the dichroic prism 29. The dichroic prism 29 transmits the G light therethrough and perpendicularly reflects the B light and R light. Thus, the three color light components are combined by the dichroic prism 29, so as to be made incident on a lens group 30a.

For improving the contrast of projected images, quarter wave plates 20a, 20b, 20c are disposed upstream the LCDs 21a, 21b, 21c, respectively. Polarizing plates 18a, 22a are disposed on the light entrance side (light source side) and light exit side (projection lens side) of the PBS 19, respectively, so as to adjust deviations in polarization directions. Specific wavelength polarization converters 25, 27 are disposed on the light entrance side (light source side) and light exit side (projection lens side) of the PBS 26, respectively, so as to convert the polarization of B light into P polarization. Polarizing plates 18b, 22b are disposed so as to hold the converters 25, 27, thereby adjusting deviations in polarization directions. In particular, the polarizing plates 18a, 18b adjust the deviations in polarization directions caused when the luminous fluxes travel by way of the dichroic mirror 16, thereby preventing the light utilization efficiency and the contrast of projected images from decreasing.

Figure 4:
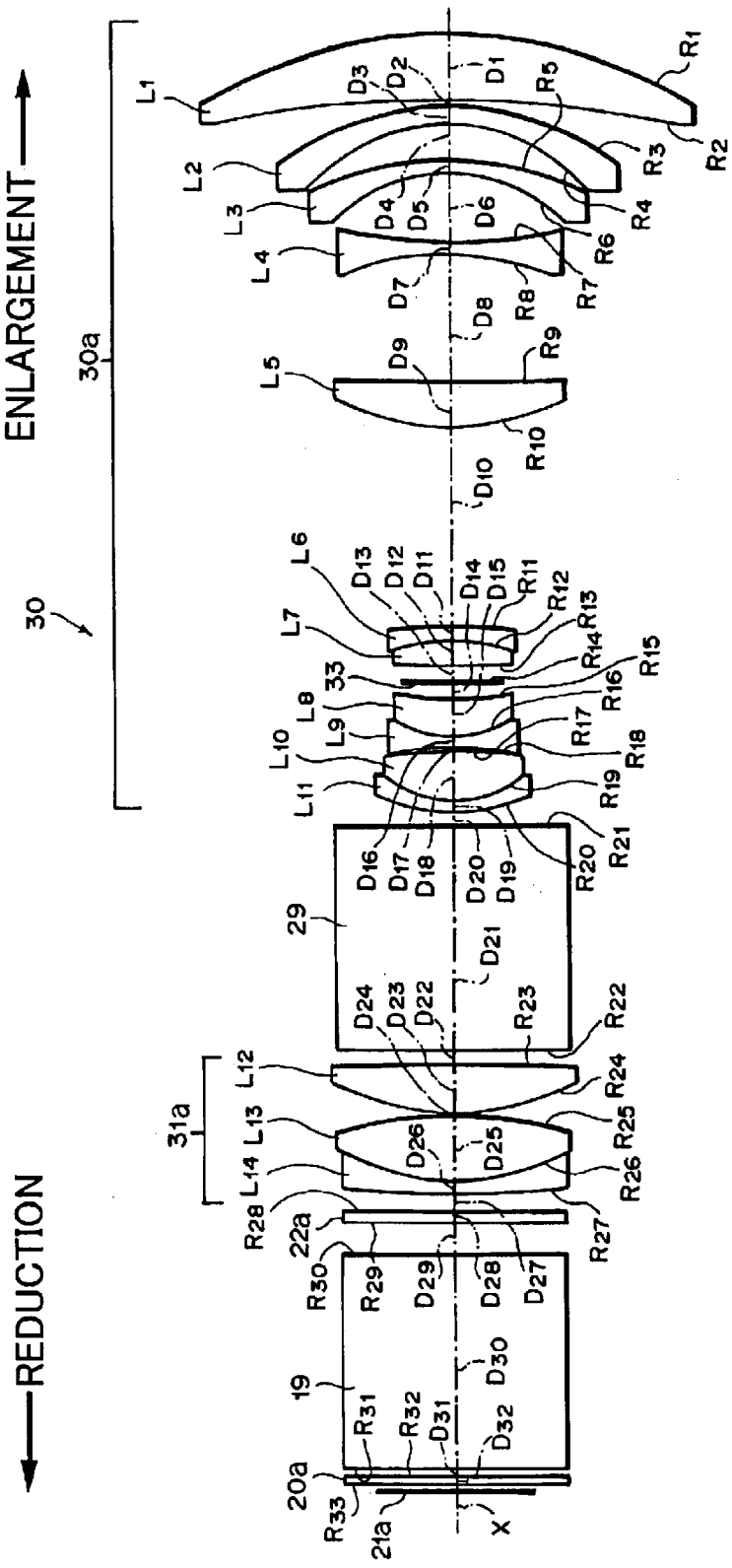
FIG. 4 is an enlarged view of the projection lens in accordance with Example 1.

Also, as shown in FIG. 1, lens groups 31a, 31b having a positive refracting power are disposed upstream the dichroic prism 29 acting as color light combining means, so that the lens groups 31a and 30a constitute a projection lens 30, and the lens groups 31b and 30a also constitute the projection lens 30. The projection lens 30 comprises a stop 33 therewithin. FIG. 4 shows a configuration of the projection lens 30. Though FIG. 4 shows the projection lens 30 to the LCD 21a as a representative of the LCDs, substantially the same configuration is attained with respect to the other LCDs 21b, 21c. The lens group 31b is similar to the lens group 31a.

The following Table 1 shows the radius of curvature R (standardized with the focal length taken as 1) of each lens surface, center thickness of each lens and air space between each pair of neighboring lenses D (standardized with the focal length taken as 1), and refractive index N and Abbe number v of each lens at d-line of the projection lens 30 in accordance with this example. In Table 1 and Table 2, which will be explained later, the numbers referring to the letters R, D, N, and v successively increase from the enlargement side.

Example 2

Figure 5:
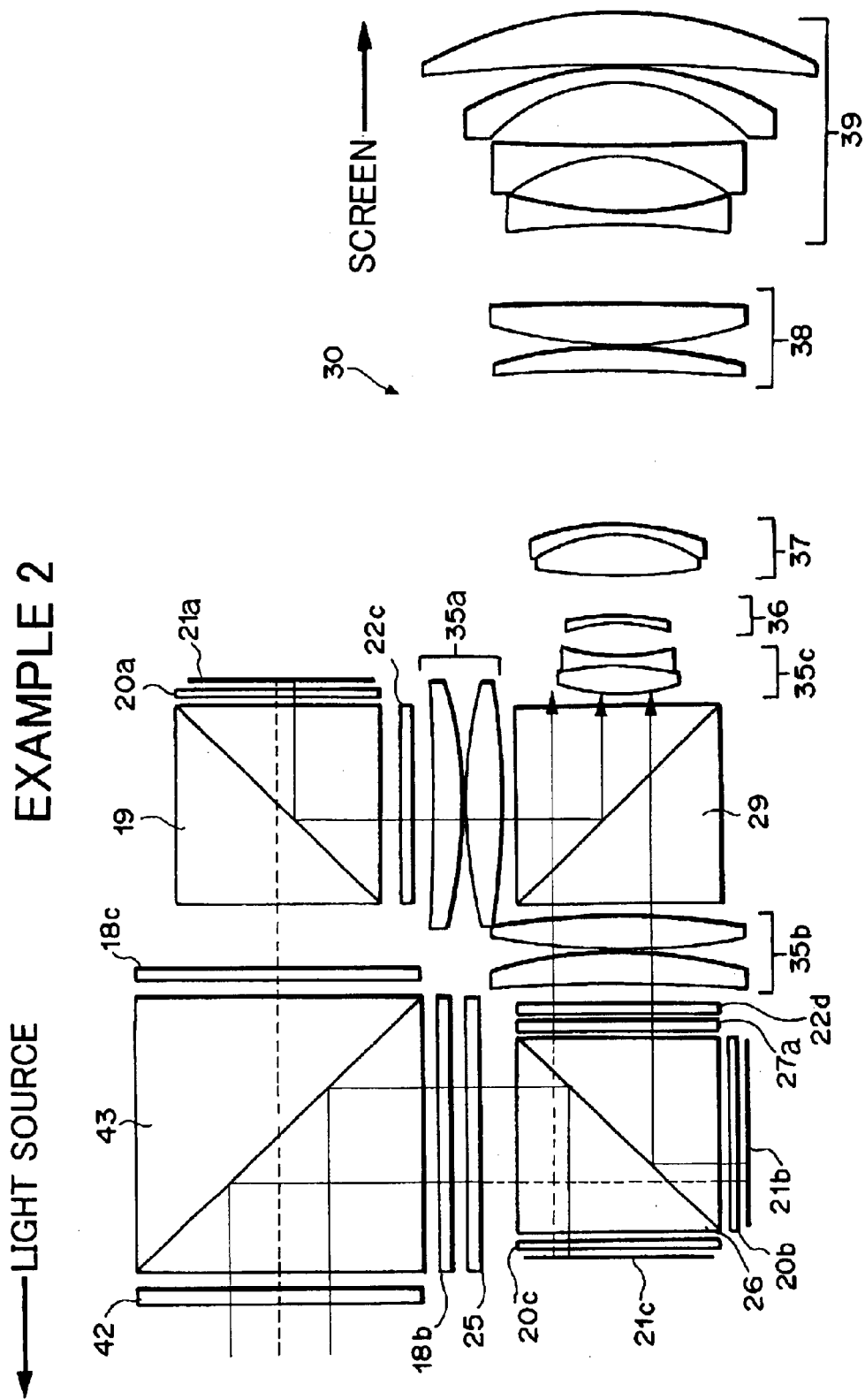
FIG. 5 is a schematic view of the projection type display apparatus in accordance with Example 2.

FIG. 5 is a plan view showing a major part of the projection type display apparatus in accordance with Example 2 of the present invention. This example is based on the above-mentioned second embodiment, and relates to an apparatus comprising, as color separating means, a specific wavelength polarization converter 42 for converting the polarization of light in a specific wavelength band into a polarization direction having a predetermined angle and a PBS 43 for separating incident light according to its polarization direction. The outline of the whole apparatus is as mentioned above and thus will not be explained. Here, members operating in substantially the same manner as those of the second embodiment are referred to with numerals having lower two digits and suffixes identical thereto.

The configuration of this example differs from that explained as the second embodiment in that polarizing plates 18c, 18d are disposed between the PBS 43 and respective PBSs 19, 26, so as to adjust deviations in polarization directions of the luminous fluxes; that a specific wavelength polarization converter 27a disposed on the light exit side (projection lens side) of the PBS 26 converts the polarization of the R light from P polarization to S polarization; and that a polarizing plate 22d disposed downstream the specific wavelength polarization converter 27a transmits S-polarized light therethrough. In such a configuration, unlike the configuration explained as the second embodiment, all the luminous fluxes combined by and emitted from the dichroic prism 29 are emitted as S-polarized light.

In this example, as shown in FIG. 5, lens groups 35a, 35b having a positive refracting power are disposed as the dichroic prism 29 acting as color light combining means, so that the lens groups 35a, 35c, and 36 to 39 constitute a projection lens 30, and the lens groups 35b, 35c, and 36 to 39 also constitute the projection lens 30. The projection lens 30, which is a zoom lens, comprises, successively from the enlargement side, the first lens group 39, fixed upon changing power, for focusing; the second lens group 38, third lens group 37, and fourth lens group 36, movable with a mutual relationship therebetween, for correcting an image surface movement occurring upon continuously changing power; and the fifth lens group fixed upon changing power. The fifth lens group comprises the lens groups 35c and 35a, or lens groups 35c and 35b.

Figure 6:
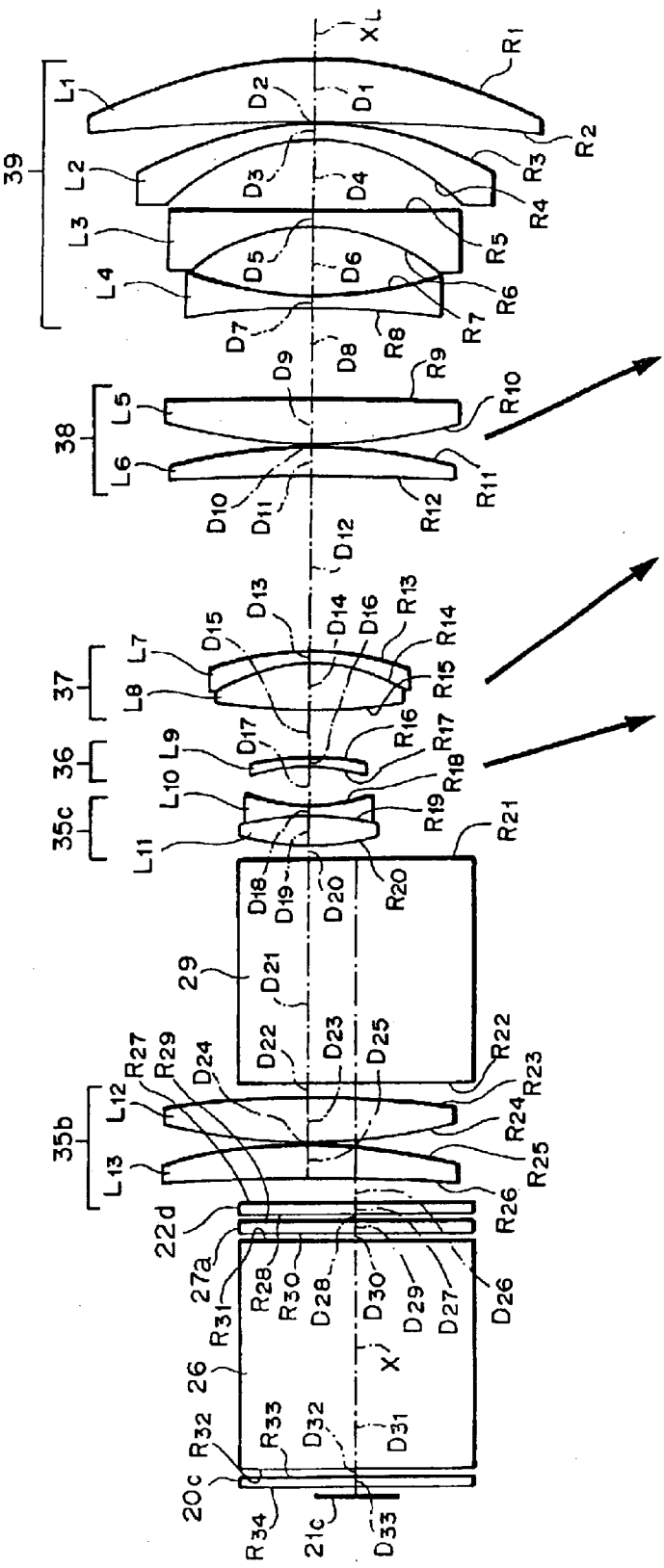
FIG. 6 is an enlarged view of the projection lens in accordance with Example 2.

FIG. 6 is a side view showing the projection lens 30 to the LCD 21c. Though FIG. 6 shows the projection lens 30 to the LCD 21c as a representative of the LCDs, substantially the same configuration is attained with respect to the other LCDs 21a, 21b. The lens group 35b is similar to the lens group 35a. FIGS. 5 and 6 show the lens positions of the projection lens 30 at its wide angle end, whereas the second to fourth lens groups 36 to 38 move as indicated by arrows in FIG. 6 toward the telephoto side.

The following Table 2 shows the radius of curvature R (standardized with the focal length taken as 1) of each lens surface, center thickness of each lens and air space between each pair of neighboring lenses D (standardized with the focal length taken as 1), and refractive index N and Abbe number v of each lens at d-line of the projection lens 30 in accordance with this example. Table 3 shows the distance (movement 1) between the first lens group 39 and second lens group 38, distance (movement 2) between the second lens group 38 and third lens group 37, distance (movement 3) between the third lens group 37 and fourth lens group 36, and distance (movement 4) between the fourth lens group 36 and fifth lens group at each of the wide angle end and telephoto end.

In the side view of FIG. 6, the optical axis $X_L$ of the projection lens 30 is shifted from the optical axis X from the LCD 21c to the dichroic prism 29 in conformity to the mode of use of the projection type display apparatus, which is usually used for projection thereabove.

Example 3

FIG. 7 is a view showing the projection type display apparatus in accordance with Example 3 of the present invention. This example is based on the above-mentioned third embodiment, and relates to an apparatus having a configuration in which the color light decomposing means also acts as color light combining means.

The configuration of the part of this apparatus upstream a condenser lens 17 is substantially the same as that of Example 1, and further comprises a total reflection mirror 50 for deflecting an optical path.

The configuration of the part of this apparatus downstream the condenser lens 17 is as explained in the third embodiment, and has a configuration in which a PBS 52 acts as both color light decomposing means and color light combining means, such that color light decomposition is effected by a specific wavelength polarization converter 51 and the PBS 52, whereas color light combination is effected by the PBS 52. Lens groups 31a, 31b are disposed on optical paths of color light components decomposed and combined by the PBS 52 between the LCDs 21a, 21b, 21c and the PBS 52.

The projection lens 30 of this example is the same as that of Example 1, and is configured such that the lens groups 30a and 31a constitute a projection lens 30, and the lens groups 30a and 31b constitute the projection lens 30.

The projection type display apparatus in accordance with the present invention is not limited to those mentioned above, and can be modified in various manners.

For example, though the first, second, and third light components are explained as G light, B light, and R light, respectively, in the above-mentioned explanation, this is not restrictive. The G light, B light, and R light may apply to the first to third color light components in any order. Namely, any color light components can be decomposed or combined in any decomposing step in the color light decomposing/combining system. Also, any color light components may be reflected and transmitted in the decomposing or combining step. The positions of respective light valves corresponding to the individual color light components are not restricted to those mentioned above. Luminous fluxes incident on the color light decomposing means preferably have a uniform polarization direction. Not only S-polarized luminous fluxes but also P-polarized luminous fluxes may be incident thereon.

In the decomposing/combining step of three color light components and setting of polarization states of these luminous fluxes, film configurations and depositions of the color light decomposing means, PBS upstream the LCDs, and color light combining means may be set appropriately such that respective LCDs for three color light components are disposed at positions irradiated with the three color light components. In this case, polarizing plates and specific wavelength polarization converters may be disposed as appropriate.

When the resolving power of the apparatus is important, for example, the above-mentioned setting is made such that the G light, which yields the highest visibility for eyes, is reflected by the minimum number of times between a light valve and a projection surface. When the contrast of the apparatus is important, the fact that S-polarized light yields a higher reflection efficiency than that of P-polarized light at surfaces separating and combining polarized light components in general. In this case, it may be better to arrange the polarization direction of G light and the respective light valves corresponding to the three color light components so as reflect the G light between the light valve and the projection surface. Optimal dispositions may vary depending on various conditions taking account of brightness, thermal problems, and the like.

In the projection type display apparatus in accordance with the present invention, predetermined color adjusting means may be disposed on an optical path. For example, the visible region of an ultrahigh pressure mercury lamp has such a characteristic that the red wavelength region in the three primary color light components has a quantity of light smaller than that of wavelength regions corresponding to the other color light components, whereas the yellow wavelength region has an optical intensity peak. The projection type display apparatus is required to yield images which are favorable in terms of not only brightness but also color reproducibility, whereby such a deviation in the spectral distribution of the light source may become problematic. When the light source light of the ultrahigh pressure mercury lamp is used as it is, totally yellowish color images may be formed. Therefore, such color adjusting means as to eliminate a light component in the wavelength region near 580 nm from the light emitted from the ultrahigh pressure mercury lamp may be disposed, so as to make the apparatus yield a favorable color reproducibility.

The color adjusting means may be disposed, for example, in the illumination optical system, immediately upstream a reflection type light valve, and downstream the color light combining means. The color adjusting means may be disposed at a plurality of these positions. Polarization characteristics, and characteristics of color light combining means may be adjusted as appropriate, so as to form color adjusting means.

In the projection type display apparatus in accordance with the present invention, the PBS is not limited to conventionally well-known ones in which a prism joint surface between two right triangle prisms is provided with a coating. For example, a wire-grid type planar PBS may be used as a PBS for separating white light into the first color light component and the second and third color light components; a PBS, disposed immediately upstream a reflection type light valve, for separating an illumination luminous flux and a projection luminous flux from each other in terms of polarization; a PBS for separating the second and third color light components from each other; and a PBS for combining the first color light component carrying image information with the second and third color light components. A wire-grid type PBS can yield a favorable polarization separation angle characteristic. Also usable is a cubic prism having the same form as that of a conventional PBS, in which a planar PBS having grid-like protrusions or depressions is held between bottom faces of two right triangle prisms.

As a member for separating incident light according to its wavelength band, a dichroic prism, for example, may be used in place of the dichroic mirror in the projection type display apparatus in accordance with the present invention.

In the projection type display apparatus in accordance with the present invention, the color light decomposing/combining system may combine devices such as PBS prism, planar PBS, dichroic prism, and dichroic mirror as appropriate. Their combination is not limited to those used in the foregoing explanation. When these devices are combined appropriately, the illumination luminous flux incident on the system and the projection luminous flux emitted from the system may be made substantially orthogonal to each other as in the color light decomposing/combining system of FIG. 2, or the illumination luminous flux and the projection luminous flux may be made substantially parallel to each other as in the color light decomposing/combining system of FIG. 3.

Figure 8A:
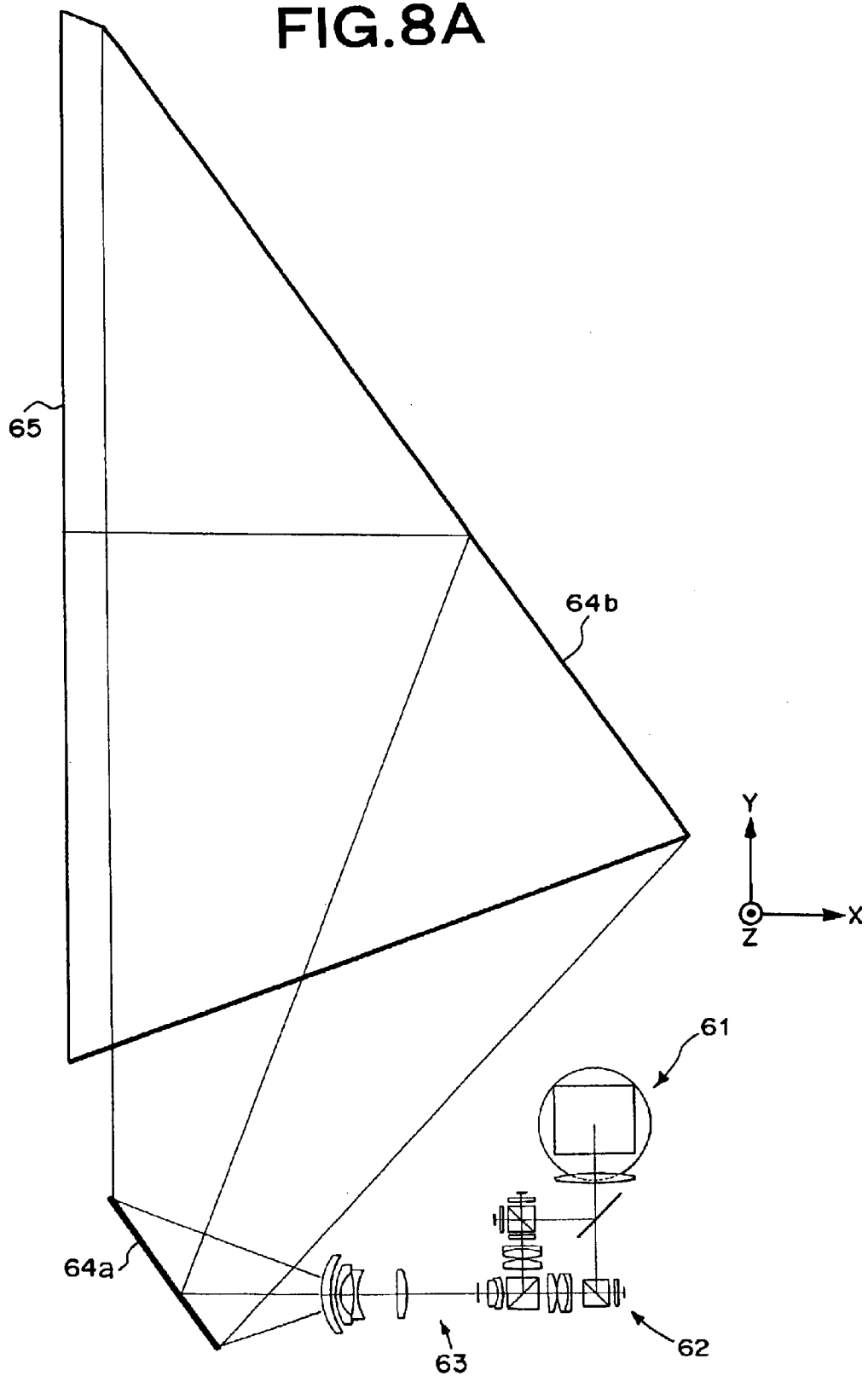
Figure 9A:
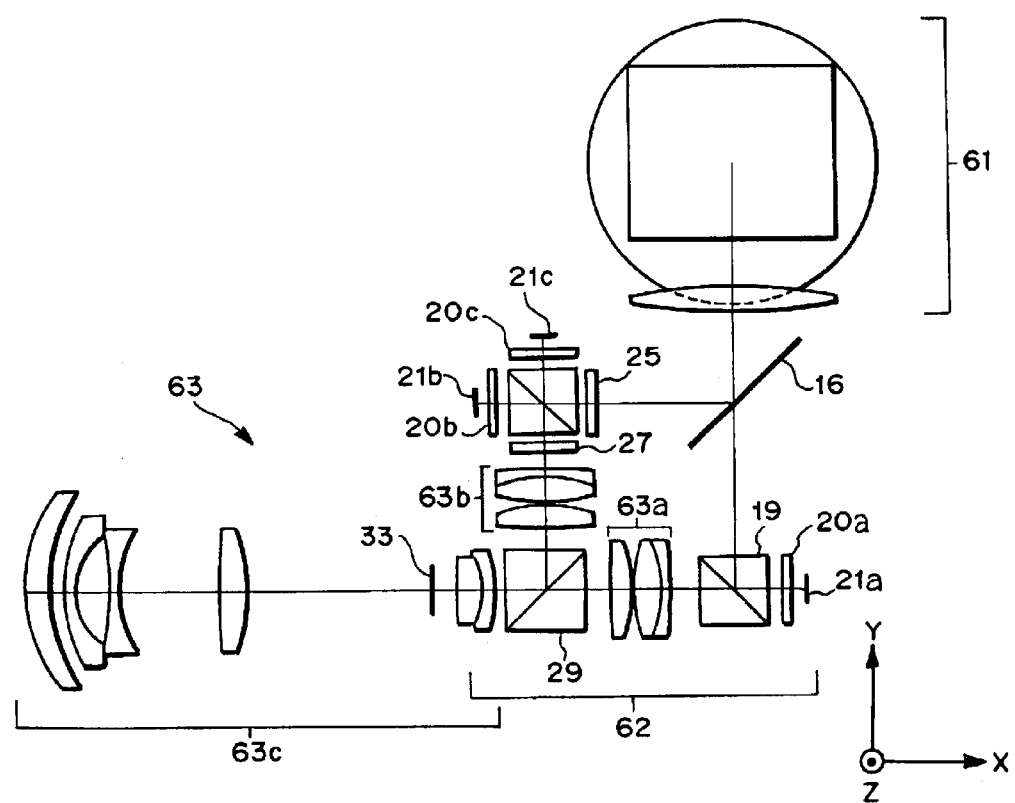
Figure 10:
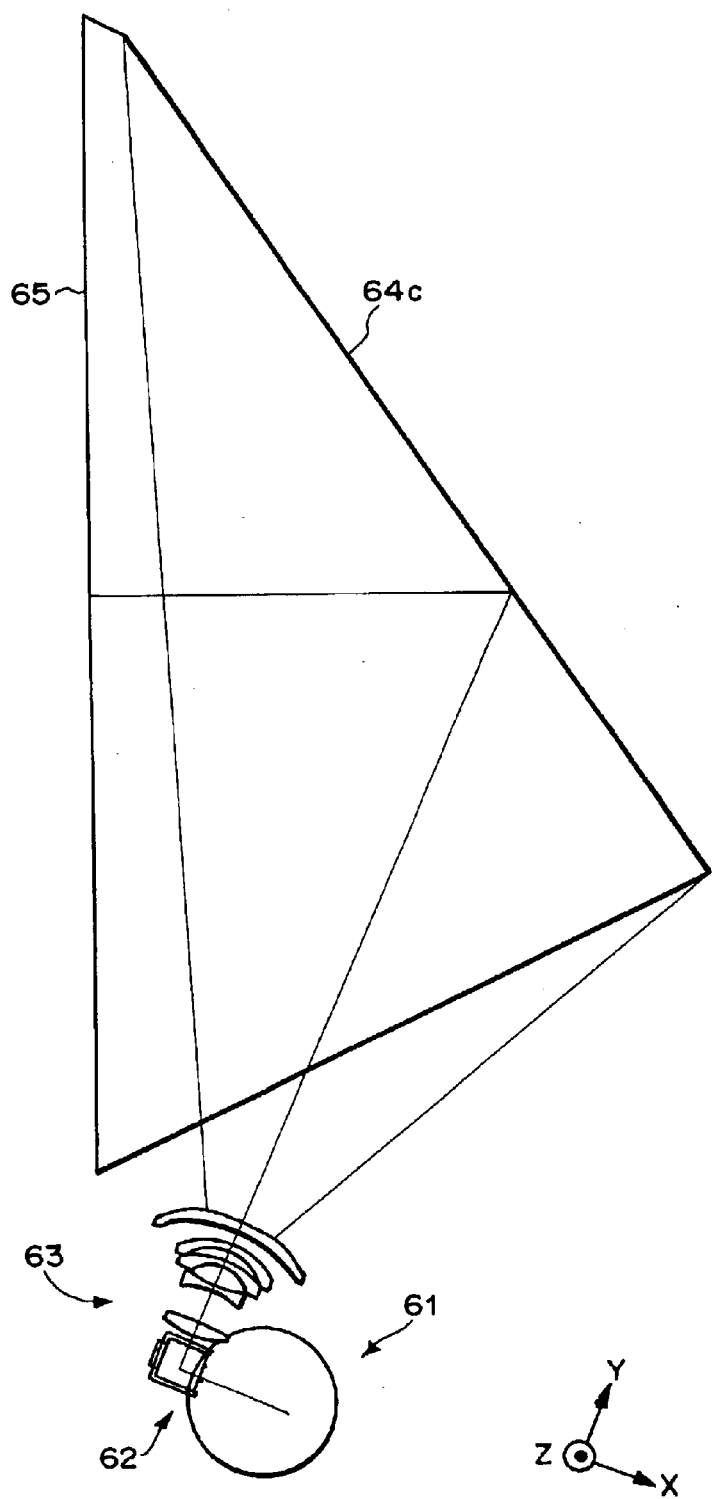
FIG. 10 is an overall sectional view of a second rear projection TV in accordance with the present invention.
Figure 11A:
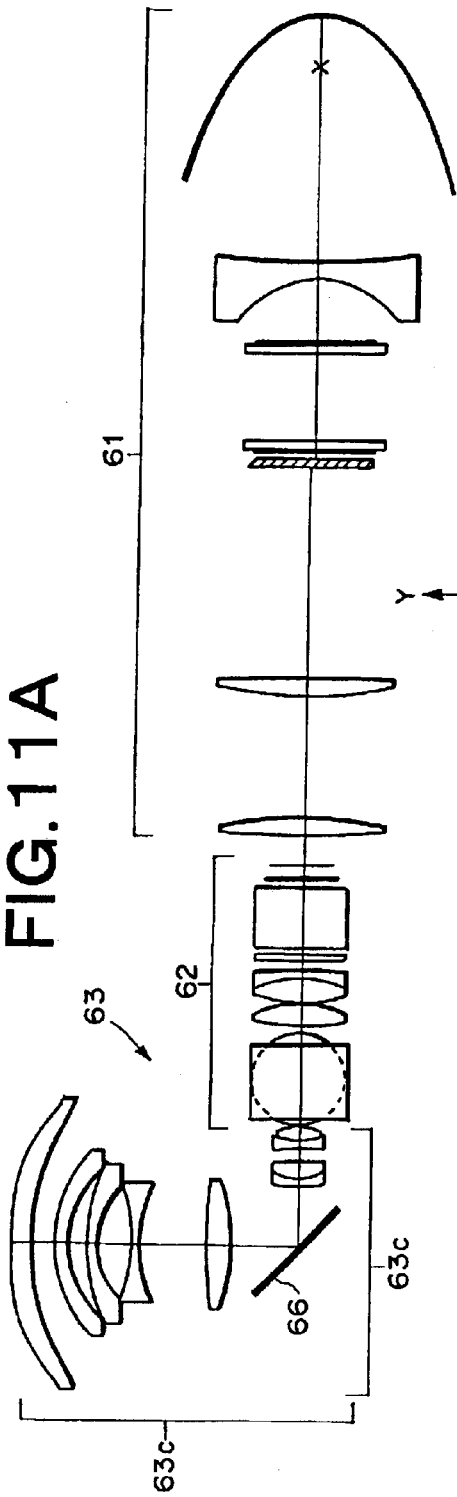
FIGS. 11A and 11B are partial sectional views of the rear projection TV shown in FIG. 10.
Figure 11B:
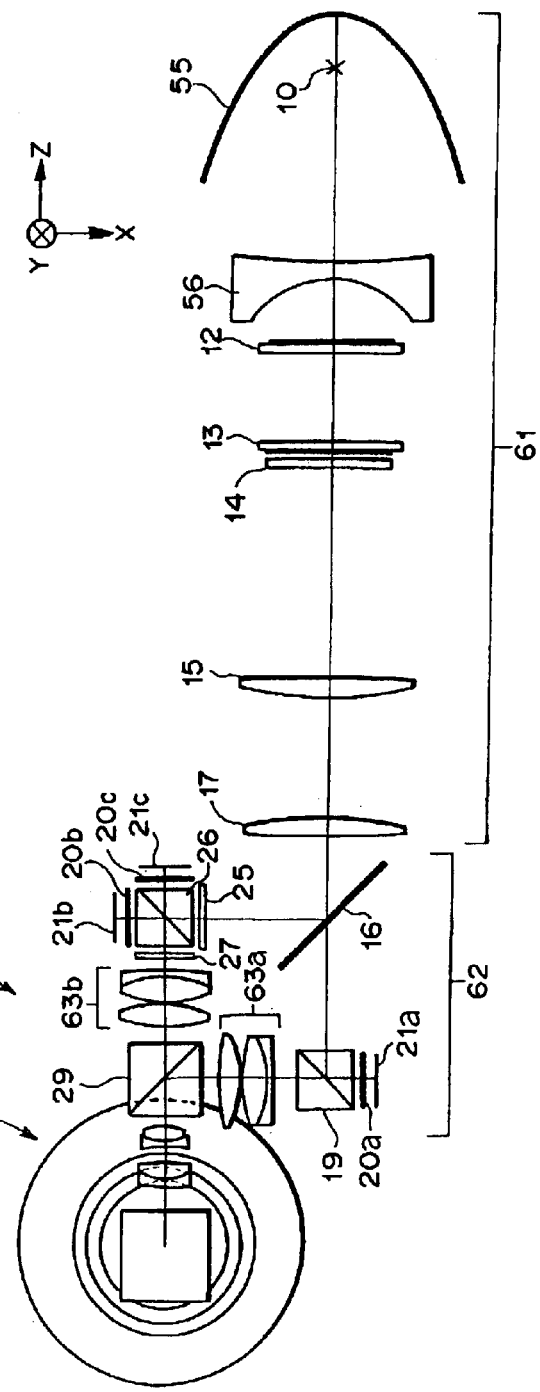

Such a configuration is determined in connection with how optical paths are set by providing a bending mirror and the like in the illumination optical system upstream the color light decomposing/combining system and in the projection lens downstream the color light decomposing/combining system. When the overall size of a set from the illumination optical system to the screen is important as in the case of a rear projection TV, a configuration suitable for making the system compact is desired in particular. Also, there is a case where the size of the whole set in a predetermined direction is desired to be made compact. For example, FIGS. 8A to 11B show two configurational examples of rear projection TV. FIGS. 8A to 9B show a first configurational example. FIGS. 10 to 11B show a second configurational examples. FIGS. 8A, 8B, and 10 are sectional views of the whole set from the illumination optical system to the screen. FIGS. 9A, 9B, 11A, and 11B are sectional views from an illumination optical system 61 to a projection lens 63. In these drawings, members operating in substantially the same manner as those of FIG. 1 are referred to with numerals having lower two digits and suffixes identical to those in FIG. 1 without repeating their overlapping descriptions.

The first configurational example relates to an example in which the optical axis of the illumination optical system 61 upstream a color decomposing/combining system 62 and the optical axis of a lens group 63c downstream the color decomposing/combining system 62 are substantially orthogonal to each other. The projection lens 63 comprises a lens group 63a and the lens group 63c, or a lens group 63b and the lens group 63c. The lens group 63c downstream the color decomposing/combining system 62 does not bend any optical path therein, whereas a total reflection mirror 50 bends an optical path within the illumination optical system 61. On the downstream of the lens group 63c, two total reflection mirrors 64a, 64b bend an optical path, whereby an image is projected onto a screen 65.

The second configurational example relates to a case where the optical axis of the illumination optical system 61 upstream the color light decomposing/combining system 62 and the optical axis of the lens group 63c downstream the color light decomposing/combining system 62 are substantially parallel to each other. Here, a luminous flux from a light source lamp 10 is reflected by a reflector 55 made of an ellipsoidal mirror and then is turned into substantially parallel light by a divergent lens 56, so as to be made incident on a first lens array 12. The projection lens 63 comprises a lens group 63a and the lens group 63c, or a lens group 63b and the lens group 63c. The illumination optical system 61 does not bend any optical path therein, whereas a total reflection mirror 66 bends an optical path within the lens group 63c. On the downstream of the lens group 63c, a total reflection mirror 64c bends an optical path, whereby an image is projected onto a screen 65.

In these configurational examples, not only the color light decomposing/combining system 62 but also the optical path of the whole projection type display apparatus is set so as to be able to achieve compactness in the whole set. Each of the above-mentioned configurational examples relates to a rear projection TV in which the longer sides of a light valve and a polarization separating/combining surface of the polarization separating/combining device are disposed parallel to each other. However, without being restricted to the above-mentioned configurational examples, the number of bends and bending directions may vary depending on conditions such as the arrangement of light valves with respect to the color light decomposing/combining part and the use as a front projector. Nevertheless, a smaller number of bends is more advantageous in terms of brightness and the like because of a lower efficiency loss caused by reflection, and in terms of assembling accuracy and cost.

In the projection type display apparatus in accordance with the present invention, not only the above-mentioned lens array but a rod integrator, for example, may be used as the integrator optical system for homogenizing the light quantity distribution of the illumination luminous flux within a cross section thereof. Usable as the rod integrator are a solid bar-shaped rod prism made of glass, a hollow prism having an inner face turned into a mirror surface by a reflection coating, a so-called hybrid integrator in which a bar-shaped rod prism disposed on the luminous flux entrance side and a hollow prism disposed on the luminous flux exit side are combined together, and a rod integrator having a polarization converting function. When these rod integrators are used, other members such as lens and polarization converting optical system are made with configurations suitable thereto.

Figure 12:
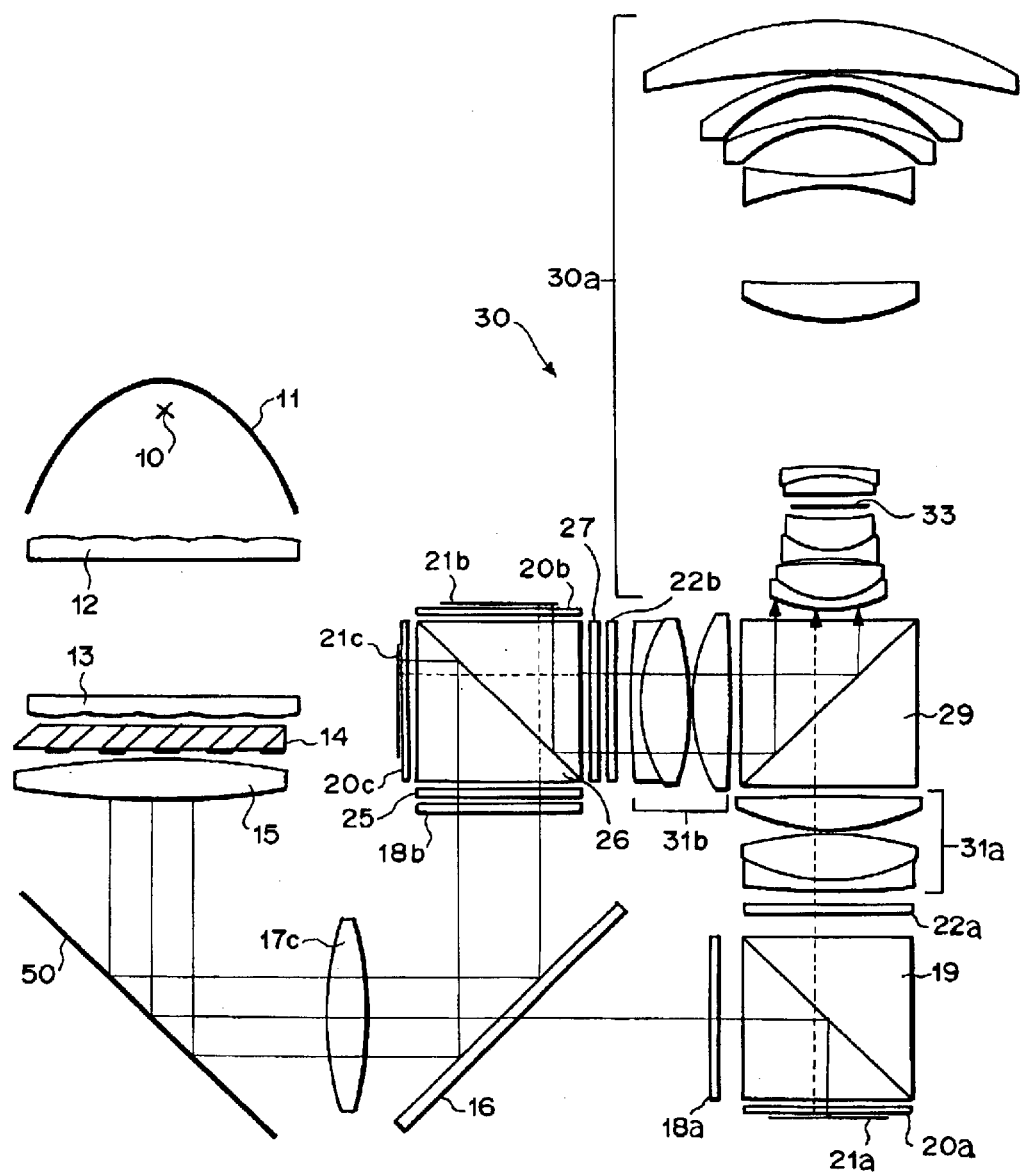
FIG. 12 is a view showing a modified example of lens position in FIG. 1.

In the projection type display apparatus in accordance with the present invention, configurations of the condenser lenses in the illumination optical system are not restricted to those mentioned above. For example, in place of the condenser lenses 17a, 17b in the projection type display apparatus shown in Example 1 (FIG. 1), a condenser lens 17 may be provided as shown in FIG. 12. Though the optical path upstream the color light decomposing means (dichroic mirror 16) becomes slightly longer, a single lens can yield a similar effect when disposed upstream the color light decomposing means, which can reduce the number of members, thereby being advantageous in terms of cost as well.

In the projection type display apparatus in accordance with the present invention, the specific wavelength polarization converter 27, 127 on the light exit side (projection lens side) of the PBS 26, 126 for separating/combining the second and third color light components is not always necessary. The specific wavelength polarization converter 25, 125 on the light entrance side (light source side) may be provided alone. The latter configuration is possible if the PBS 126 for separating/combining the second and third color light components has such an ideal performance that each color light component is emitted with a sufficiently uniform polarization direction.

Though the projection type display apparatus in accordance with the above-mentioned first and second embodiments of the present invention use two PBSs as polarization separating/combining devices, or a PBS as color light decomposing means in addition thereto, a PBS may also be used as color light combining means, whereas lenses may be arranged between the PBS acting as color light combining means and the two PBSs acting as polarization separating/combining devices.

Further, though the PBSs are used as polarization separating/combining device in accordance with the above-mentioned first and second embodiments of the present invention, other optical devices may also be used as far as they guide each color light component to respective light valves for optically modulating and emit those modulated lights.

Any projection lens having a space for arranging color light combining means in the lens can be used as the projection lens in the projection type display apparatus in accordance with the present invention without being restricted to those shown in the above-mentioned examples. Each of lenses disposed between the three-color light combining means for combining three color light components and the light valve for optically modulating the first color light component, between the three-color light combining means and the PBS acting as a polarization separating/combining device for making the first color light component incident on its corresponding light valve, and between the three-color light combining means and the two-color light combining means (which may be a PBS acting as a polarization separating/combining device) for combining the second and third color light components may be constituted by either a single element or a plurality of elements.

In the projection type display apparatus in accordance with the present invention, as explained in the foregoing, lens groups forming a part of projection lens are disposed upstream the color light combining means, whereby the focal length of the projection lens can be shortened. Therefore, without increasing sizes of the projection lens and the whole apparatus, lenses can easily be widened with a lens size on a par with the conventional one. Also, the lens groups to become a part of projection lens are not located too close to the light valves, whereby the light utilization efficiency and contrast can be made favorable. Here, when the luminous flux has a telecentric state within a polarizing beam splitter prism acting as a polarization separating/combining device, uniformity can be secured in illuminance and chromaticity distributions in images.

TABLE 1

|  | R | D | $N_d$ | $v_d$ |
|---|---|---|---|---|
| 1 | 3.8723 | 0.5963 | 1.80400 | 46.6 |
| 2 | 9.6811 | 0.0394 | | |
| 3 | 2.3002 | 0.1758 | 1.72916 | 54.7 |
| 4 | 1.5500 | 0.3041 | | |
| 5 | 2.5032 | 0.1311 | 1.71300 | 53.9 |
| 6 | 1.3432 | 0.5984 | | |
| 7 | -4.1310 | 0.1102 | 1.84666 | 23.8 |
| 8 | 2.2292 | 1.1657 | | |
| 9 | -68.8553 | 0.4177 | 1.51823 | 58.9 |
| 10 | -2.0708 | 1.7894 | | |
| 11 | 4.9811 | 0.1013 | 1.81600 | 46.6 |
| 12 | 1.3893 | 0.2419 | 1.84666 | 23.8 |
| 13 | -11.8725 | 0.1268 | | |
| 14 (STOP) | ∞ | 0.1506 | | |
| 15 | -2.6658 | 0.3546 | 1.84666 | 23.8 |
| 16 | -0.8822 | 0.1013 | 1.74000 | 28.3 |
| 17 | 3.4543 | 0.0266 | | |
| 18 | 5.9538 | 0.4559 | 1.51633 | 64.1 |
| 19 | -0.8721 | 0.1013 | 1.84666 | 23.8 |
| 20 | -1.5168 | 0.1162 | | |
| 21 | ∞ | 2.0137 | 1.51633 | 64.1 |
| 22 | ∞ | 0.1162 | | |
| 23 | 27.4024 | 0.4334 | 1.60300 | 65.4 |
| 24 | -2.2591 | 0.0156 | | |
| 25 | 3.4275 | 0.5825 | 1.49700 | 81.5 |
| 26 | -1.9512 | 0.1102 | 1.84666 | 23.8 |
| 27 | -10.7451 | 0.2546 | | |
| 28 | ∞ | 0.1624 | 1.51633 | 64.1 |
| 29 | ∞ | 0.1000 | | |
| 30 | ∞ | 1.9362 | 1.49700 | 81.5 |
| 31 | ∞ | 0.1500 | | |
| 32 | ∞ | 0.0700 | 1.51633 | 64.1 |
| 33 | ∞ | | | |

TABLE 2

|  | R | D | $N_d$ | $v_d$ |
|---|---|---|---|---|
| 1 | 2.0525 | 0.2800 | 1.72916 | 54.7 |
| 2 | 9.4576 | 0.0086 | | |
| 3 | 1.5702 | 0.0772 | 1.58913 | 61.1 |
| 4 | 0.9039 | 0.3191 | | |
| 5 | -26.2322 | 0.0656 | 1.71736 | 29.5 |
| 6 | 0.8764 | 0.3092 | | |
| 7 | -1.7652 | 0.0618 | 1.49700 | 81.5 |
| 8 | 3.9824 | (MOVEMENT 1) | | |
| 9 | 20.7288 | 0.2170 | 1.84666 | 23.8 |
| 10 | -2.2248 | 0.0084 | | |
| 11 | 2.3436 | 0.1351 | 1.84666 | 23.8 |
| 12 | 10.9024 | (MOVEMENT 2) | | |
| 13 | 1.3107 | 0.0367 | 1.84666 | 23.8 |
| 14 | 0.7301 | 0.2353 | 1.61772 | 49.8 |
| 15 | -2.3714 | (MOVEMENT 3) | | |
| 16 | 1.3065 | 0.0367 | 1.84666 | 23.8 |
| 17 | 0.8124 | (MOVEMENT 4) | | |
| 18 | -0.8178 | 0.0444 | 1.84666 | 23.8 |
| 19 | 1.3456 | 0.1463 | 1.71300 | 53.9 |
| 20 | -1.0237 | 0.0633 | | |
| 21 | ∞ | 1.0557 | 1.51633 | 64.1 |
| 22 | ∞ | 0.0633 | | |
| 23 | 4.0684 | 0.1959 | 1.80100 | 35.0 |
| 24 | -2.6913 | 0.0084 | | |
| 25 | 2.4213 | 0.1605 | 1.84666 | 23.8 |
| 26 | 10.1662 | 0.1301 | | |
| 27 | ∞ | 0.0450 | 1.51633 | 64.1 |
| 28 | ∞ | 0.0150 | | |
| 29 | ∞ | 0.0450 | 1.51633 | 64.1 |
| 30 | ∞ | 0.0500 | | |
| 31 | ∞ | 1.0557 | 1.49700 | 81.5 |
| 32 | ∞ | 0.0800 | | |
| 33 | ∞ | 0.0367 | 1.51633 | 64.1 |
| 34 | ∞ | | | |

TABLE 3

|  | WIDE | TELEPHOTO |
|---|---|---|
| MOVEMENT 1 | 0.4155 | 0.2640 |
| MOVEMENT 2 | 0.8364 | 0.7048 |
| MOVEMENT 3 | 0.2222 | 0.4140 |
| MOVEMENT 4 | 0.1912 | 0.2825 |

What is claimed is:

1. A projection type display apparatus chromatically decomposing white light emitted from a light source into color light components, chromatically combining said color light components after image modulation, and projecting a desirable image onto a screen by using a projection lens; said apparatus comprising:

color light decomposing means for decomposing said white light into a first color light component in three color light components and the remaining second and third color light components, and emitting thus obtained color light components into respective directions different from each other;

a first optical device for guiding said first color light component emitted from said color light decomposing means to a first reflection type light valve for optically modulating said first color light component and emitting said first color light component optically modulated by said first reflection type light valve;

a second optical device consisting of a polarization separating/combining device for separating said second and third color light components emitted from said color light decomposing means into said second and third color light components, guiding said two color light components to second and third light valves for optically modulating the respective color light components, combining said second and third color light components optically modulated by said light valves, and emitting thus combined color light components; and color light combining means for combining said first color light component emitted from said first optical device and said second and third color light components emitted from said second optical device;

wherein a first lens comprising at least one lens element is disposed between said first optical device and said color light combining means; and wherein a second lens comprising at least one lens element is disposed between said second optical device and said color light combining means.

2. A projection type display apparatus according to claim 1, wherein each of said first and second lenses has a positive refracting power as a whole, said first lens and a third lens disposed on the light exit side of said color light combining means constituting said projection lens, said second and third lenses constituting said projection lens.

3. A projection type display apparatus according to claim 1, wherein polarization direction converting means for converting said white light emitted from said light source into linearly polarized light vibrating in one direction is disposed upstream said color light decomposing means.

4. A projection type display apparatus according to claim 1, wherein a polarization converter for converting polarization of light in a specific wavelength band into a polarization direction having a predetermined angle is disposed on a side of said second optical device where a luminous flux from said color light decomposing means is incident.

5. A projection type display apparatus according to claim 1, wherein a polarization converter for converting polarization of light in a specific wavelength band into a polarization direction having a predetermined angle is disposed on each of sides of said second optical device where a luminous flux from said color light decomposing means is incident and where a luminous flux is emitted to said color light combining means.

6. A projection type display apparatus according to claim 1, wherein said color light combining means is constituted by a dichroic prism.

7. A projection type display apparatus according to claim 1, wherein said color light decomposing means comprises color separating means for decomposing incident light according to a wavelength band thereof.

8. A projection type display apparatus according to claim 1, wherein said color light decomposing means is constituted by a polarization converter for converting polarization of light in a specific wavelength band into a polarization direction having a predetermined angle, and a polarization separating device for separating incident light according to a polarization direction thereof.

9. A projection type display apparatus according to claim 5, wherein a polarizing plate is disposed on the exit side of each of said first and second optical devices for light directed to said color light combining means.

10. A projection type display apparatus according to claim 4, wherein a polarizing plate is disposed on the entrance side of each of said first and second optical devices for light from said color light decomposing means.

11. A projection type display apparatus according to claim 1, wherein said reflection type light valves comprise reflection type liquid crystal display devices.

12. A projection type display apparatus comprising:

three-color light combining means for combining a first color light component of three primary color light components with the remaining second and third color light components, said first and said remaining second and third color light components being incident on said three-color light combining means in two directions different from each other after being optically modulated by respective reflection type light valves corresponding to said three primary color light components;

two-color light combining means for combining said second and third color light components;

a first lens disposed between said three-color light combining means and said reflection type light valve for optically modulating said first color light component, said first lens comprising at least one lens element;

a second lens disposed between said two-color light combining means and said three-color light combining means, said second lens comprising at least one lens element; and a third lens disposed on a light exit side of said three-color light combining means;

said first and third lenses constituting a projection lens;

said second and third lenses constituting a projection lens.

13. A projection type display apparatus according to claim 12, further comprising color light decomposing/combining means for decomposing white light emitted from a light source into said first color light and said remaining second and third color light components, and emitting thus obtained color light components into two directions different from each other, said color light decomposing/combining means also acting as said three-color light combining means;

said first or second lens being disposed on an optical path of said color light components decomposed and combined by said color light decomposing/combining means.

14. A projection type display apparatus according to claim 13, wherein said color light decomposing/combining means comprises a polarization separating/combining device.

15. A projection type display apparatus according to claim 13, further comprising a polarization converter for converting polarization of light in a specific wavelength band into a polarization direction having a predetermined angle, said polarization converter being disposed on a side of said color light decomposing/combining device where a luminous flux from said light source is incident.

16. A projection type display apparatus according to claim 13, wherein said two-color light component combining means comprises color separating means for decomposing incident light according to a wavelength band thereof.

17. A projection type display apparatus according to claim 13, further comprising a polarizing plate disposed on a side of said color light decomposing/combining device where a luminous flux from said light source is incident.

18. A projection type display apparatus according to claim 12, wherein said reflection type light valves comprise reflection type liquid crystal display devices.

19. A projection type display apparatus according to claim 5, wherein a polarizing plate is disposed on the entrance side of each of said first and second optical devices for light from said color light decomposing means.

20. A projection type display apparatus according to claim 1, wherein said first optical device comprises polarization separating/combining devices for light.

* * * * *